US010037312B2

(12) United States Patent
Mardanbegi et al.

(10) Patent No.: US 10,037,312 B2
(45) Date of Patent: Jul. 31, 2018

(54) METHODS AND SYSTEMS FOR GAZE ANNOTATION

(71) Applicant: FUJI XEROX CO., LTD., Tokyo (JP)

(72) Inventors: Diako Mardanbegi, Copenhagen (DK); Pernilla Qvarfordt, Los Altos, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 79 days.

(21) Appl. No.: 14/667,529

(22) Filed: Mar. 24, 2015

(65) Prior Publication Data

US 2016/0283455 A1   Sep. 29, 2016

(51) Int. Cl.
| | |
|---|---|
| *H04N 5/93* | (2006.01) |
| *H04N 9/47* | (2006.01) |
| *G11B 27/00* | (2006.01) |
| *G06F 17/24* | (2006.01) |
| *G06F 3/01* | (2006.01) |
| *G10L 15/26* | (2006.01) |
| *H04N 7/18* | (2006.01) |

(52) U.S. Cl.
CPC ............ *G06F 17/241* (2013.01); *G06F 3/013* (2013.01); *G10L 15/26* (2013.01)

(58) Field of Classification Search
CPC .. H04N 7/18; H04N 9/47; H04N 9/80; H04N 5/93; G11B 27/00
USPC ....................... 386/239, 278, 248; 348/61, 78
See application file for complete search history.

(56) References Cited

U.S. PATENT DOCUMENTS

| | | | | |
|---|---|---|---|---|
| 8,443,279 B1 * | 5/2013 | Hameed | ............. | A61B 1/00041 715/201 |
| 2015/0130838 A1 * | 5/2015 | Kasahara | ........... | G06K 9/00671 345/633 |

OTHER PUBLICATIONS

Darren G. and Alan T. C. See what I'm saying?: using fJ Dyadic Mobile Eye tracking to study collaborative reference. In Proceedings of CSCW '11 (2011), 435-444.
Hartley, R., and Zisserman, A. Multiple view geometry 'j in computer vision. Cambridge University Press, Cambridge, UK, 2000.
Hollerer, T., Feiner, S. and Pavlik, J. Situated Documentaries: Embedding Multimedia Presentations in the Real World. In Proceedings of IEEE ISWC '99. (1999),79.
Haytham Gaze tracker, http://www.itu.dk/research/eye, Sep. 2014.
Lee, J.Y., Lee, S., Park, H.M., Lee, S.K., Choi, J.S. and Kwon, J.S. Design and implementation of a wearable AR annotation system using gaze interaction, Consumer Electronics (ICCE), (20 1 0), 185-186.

(Continued)

*Primary Examiner* — Daquan Zhao
(74) *Attorney, Agent, or Firm* — Morgan, Lewis & Bockius LLP

(57) ABSTRACT

A gaze annotation method for an image includes: receiving a user command to capture and display a captured image; receiving another user command to create an annotation for the displayed image; in response to the second user command, receiving from the gaze tracking device a point-of-regard estimating a user's gaze in the displayed image; displaying an annotation anchor on the image proximate to the point-of-regard; and receiving a spoken annotation from the user and associating the spoken annotation with the annotation anchor. A gaze annotation method for a real-world scene includes: receiving a field of view and location information; receiving from the gaze tracking device a point-of-regard from the user located within the field of view; capturing and displaying a captured image of the field of view; while capturing the image, receiving a spoken annotation from the user; and displaying an annotation anchor on the image.

20 Claims, 17 Drawing Sheets

(56) References Cited

OTHER PUBLICATIONS

Rose, E., Breen, D., Ahlers, K.H., Crampton, C., Tuceryan, M., Whitaker, R. and Greer. D. Annotating real-world objects using augmented reality. In Computer graphics, Rae Earnshaw and John Vince (Eds.). Academic Press Ltd, London, UK, (1995) 357-370.

Tanaka, K., Kunze~ K., Iwata, M. and Kise, K. Memory Specs-An Annotatwn System on Google Glass using Document Image Retrieval. Proceedings of UbiComp'14 Adjunct (2014).

Buscher, Georg, Andress Dangel, and Ludger can Elst. "Query expansion using gaze-based feedback on the subdocument level," In Proceedings of the 31st annual international ACM SIGIR conference on Research and Development in Information Retrieval, pp. 387-394, ACM 2008.

Buscher, Georg, Andress Dangel, and Ludger can Elst, and Florian Mittag. "Generating and using gaze-based document annotations." In CHI'08, Extended Abstract on Human Factors in Computing Systems, pp. 3045-3050. ACM, 2008.

\* cited by examiner

METHODS AND SYSTEMS FOR GAZE ANNOTATION

TECHNICAL FIELD

The present application generally describes imaging technologies and more particularly methods and systems for gaze annotation of digital images.

BACKGROUND

Sharing visual information during distributed collaboration can be challenging when the collaborators are not situated in an office environment and need a hands-free system for communication. In these work situations, conventional systems use a head mounted device (HMD) with front-facing camera and a wearable computer, which allows users to share their respective views with each other. A front-view video (pre-recorded or live-view) or a single snapshot can communicate visual information quite well; however, these conventional systems do not facilitate a user pointing things out in the shared video or snapshot, which would make the communication more precise and less open to critical misinterpretations.

New wearable computing devices such as Google Glass or Vuzix smart Glasses offer a new way of communicating with collaborators by easily taking and sharing personal views. As communicating with images is becoming widely accepted, images are by necessity accompanied by words, annotations and tags to convey a complete message. Several systems in existence today can be used for creating and retrieving annotations of signs and posters using Google Glass. However, in such systems, photos taken by the Glass' camera often have a wide-angle view to match the user's field of view, hence photos often capture peripheral objects that can distract from the message that the user wants to communicate. Previous research has shown that annotations that visually communicate referential information, simplify and disambiguate communication. However, wearable computing devices often have limited input methods, in particular, for adding precise markers in images. Thus, there is a need for a natural pointing mechanism that uses a wearable computing device for making annotations.

SUMMARY

During distributed communication, it may be important to communicate information using images. In these situations the communication can be facilitated if it is possible to point things out in the image to other participants in the communication. The present disclosure aims to provide an easy and non-intrusive way to add annotations to different areas in an imaged field of view using deictic gaze gestures. In some implementations, the field of view is captured as photos or video, or as a location using location sensors. When making an annotation, the user looks at different points in their field of view, either in the real-word or in a captured image, and speaks the annotation. While speaking and looking at the scene (a captured or real scene), in accordance with some implementations, the gaze annotation system records the gaze position and analyzes the speech for deictic keyword, such as "here," "there" and "this." As used herein, a deictic keyword is defined as an expression including a deictic word such as "this", "that", "here", "there" etc. to refer to an object in the environment within which a user is located when the user makes an utterance. When a deictic keyword is found in the speech, the gaze in connection to it is used as location reference to the real-word or as a location within a photo. When annotation is done, a visual annotation anchor is inserted into the captured scene and a remote user can access the annotation by looking at the anchor.

The present disclosure describes a system for creating and sharing gaze enhanced annotations to a scene. The user creates a gaze annotation by acting naturally. A scene can be the real world, a captured video, or a photo. In some implementations, a head-mounted system is used to capture and/or annotate scenes. In some implementations, a head-mounted display system includes: 1) a front-facing scene camera to record video and photos, 2) a display to show captured photos or recorded videos, 3) an eye tracking camera to track the users' gaze, and 4) computer processing and communication capabilities. From the gaze data received from the eye-tracking camera, a point-of-regard is calculated. In some implementation, a point-of-regard is estimated from a single gaze data point at a specific point in time. In other implementations, a point-of-regard is estimated from a stream of gaze data points from which fixations are detected. In some implementations, the system also makes use of automatic speech recognition (ASR) to convert speech to constituent words. Optionally, the system can include accelerometers and various location devices to determine the location of the scene. In some implementations, annotated images can be shared with other users of the same head-mounted system. In some implementations, annotated images can be shared with other users.

None of the previous works directed to creating annotations have focused their attention of using gaze for creating and sharing annotations using gaze tracking in head-mounted display.

In accordance with some implementations, a gaze annotation method for an image is performed at a first computing device coupled with a scene camera, display, and gaze tracking device. The method includes receiving a first user command to capture and display an image from the scene camera; receiving a second user command to create an annotation for the displayed image; in response to the second user command, receiving from the gaze tracking device a first point-of-regard estimating a user's gaze in the displayed image; displaying an annotation anchor on the image proximate to the first point-of-regard; and receiving a spoken annotation from the user and associating the spoken annotation with the annotation anchor.

In some implementations, the method further includes saving the image, the spoken annotation, the first point-of-regard as the annotation anchor, and a deictic gaze marker as an object that is configured for subsequent access by one or more users; and sharing the object with one or more second users.

In some implementations, the method further includes at a second computing device of one of the second users, which includes a second display and a second gaze tracking device, accessing the object and displaying the image and the annotation anchor; detecting a second point-of-regard of the second user on the displayed image that is proximate to the annotation marker; retrieving the annotation anchor and the deictic gaze marker; and displaying on the displayed image the deictic gaze marker in the context of the image while playing the spoken annotation.

In some implementations, receiving a spoken annotation from the user includes transcribing the spoken annotation using automatic speech recognition; receiving a set of points-of-regard collected while user utters the spoken annotation; from the transcribed spoken annotation, identifying a keyword indicative of a deictic reference of a point-ofregard; aligning the keyword with a matching point-of-regard from a set of points-of-regard; and displaying a deictic gaze marker as a visualization of the deictic reference.

In some implementations, the scene camera device is head mounted and includes at least one of an accelerometer, gyroscope, or global positioning system to collect image information including the location and orientation of the camera device.

In some implementations, the gaze tracking device includes an eye camera and a gaze computing device coupled to the eye camera, such that the eye camera captures a stream of eye images of the user's eye; and the gaze computing device receives the stream of eye images captured by the eye camera and performs gaze estimation from the stream of eye images to compute corresponding points-of-regard.

In some implementations, the second users are different from the first user and the second computing device is distinct from the first computing device.

In some implementations, sharing the object with one or more second users comprises one or more of posting the object on a web site and sending the object to the one or more users via an electronic message.

In accordance with some implementations, a gaze annotation method for a real-world scene is performed at a computing device coupled with a scene camera, display, gaze tracking device and location device. The method includes receiving a first field of view and first location information from the camera and location device respectively; receiving from the gaze tracking device a first point-of-regard from the user located within the first field of view; capturing and displaying a first image of the first field of view from the scene camera; while capturing the first image, receiving a spoken annotation from the user; and displaying an annotation anchor on the first image, wherein location of the first annotation anchor is calculated from the first point-of-regard, the first field of view and first location information in the first image.

In accordance with some implementations, receiving a spoken annotation from the user includes receiving a set of field of views and a set of location information from the scene camera and location device respectively; in accordance with a detection that a position of the user has changed based on the first field of view, the first location information, the set of field of views, and the set of location information, recording a second image of a second field of view; and combining the first image and the second image using image stitching.

In accordance with some implementations, the method further includes transcribing the spoken annotation using automatic speech recognition; receiving a set of points-of-regard collected while the user utters the spoken annotation; from the transcribed spoken annotation, identifying a keyword indicative of a deictic reference of a point-of-regard; aligning the keyword with a matching point-of-regard from the set of points-of-regard; and displaying a deictic gaze marker as a visualization of the deictic reference.

In accordance with some implementations, the method further includes saving the image, the spoken annotation, the first gaze point-of-regard as an annotation anchor, the matching point-of-regard as a deictic gaze marker as an object that is configured for subsequent access by one or more users; and sharing the object with one or more second users.

In accordance with some implementations, the method further includes at a second computing device of one of the second users, wherein the second computing device includes a second display and a second gaze tracking device: accessing the object and displaying the image and the annotation anchor; detecting a second point-of-regard of the second user on the displayed image that is proximate to the annotation anchor; retrieving the spoken annotation and the deictic gaze marker; and displaying on the displayed image the deictic gaze marker in the context of the image while playing the spoken annotation.

A gaze annotation device includes a display, a scene camera, a gaze tracking device, memory, one or more processors, and one or more programs stored in the memory and configured for execution by the one or more processors. The one or more programs include instructions for receiving a first user command to capture and display an image from the scene camera; receiving a second user command to create an annotation for the displayed image; in response to the second user command, receiving from the gaze tracking device a first point-of-regard estimating a user's gaze in the displayed image; displaying on the display an annotation anchor on the image proximate to the first point-of-regard; and receiving a spoken annotation from the user and associating the spoken annotation with the annotation anchor.

A non-transitory computer readable storage medium storing one or more programs to be executed by a computer system with a display, a scene camera, a gaze tracking device, memory, and one or more processors. The one or more programs include instructions for receiving a first user command to capture and display an image from the scene camera; receiving a second user command to create an annotation for the displayed image; in response to the second user command, receiving from the gaze tracking device a first point-of-regard estimating a user's gaze in the displayed image; displaying on the display an annotation anchor on the image proximate to the first point-of-regard; and receiving a spoken annotation from the user and associating the spoken annotation with the annotation anchor.

BRIEF DESCRIPTION OF THE DRAWINGS

Like reference numerals refer to corresponding parts throughout the drawings.

DESCRIPTION OF IMPLEMENTATIONS

Reference will now be made in detail to various implementations, examples of which are illustrated in the accompanying drawings. In the following detailed description, numerous specific details are set forth in order to provide a thorough understanding of the invention and the described implementations. However, the invention may be practiced without these specific details. In other instances, well-known methods, procedures, components, and circuits have not been described in detail so as not to unnecessarily obscure aspects of the implementations.

Figure 1:
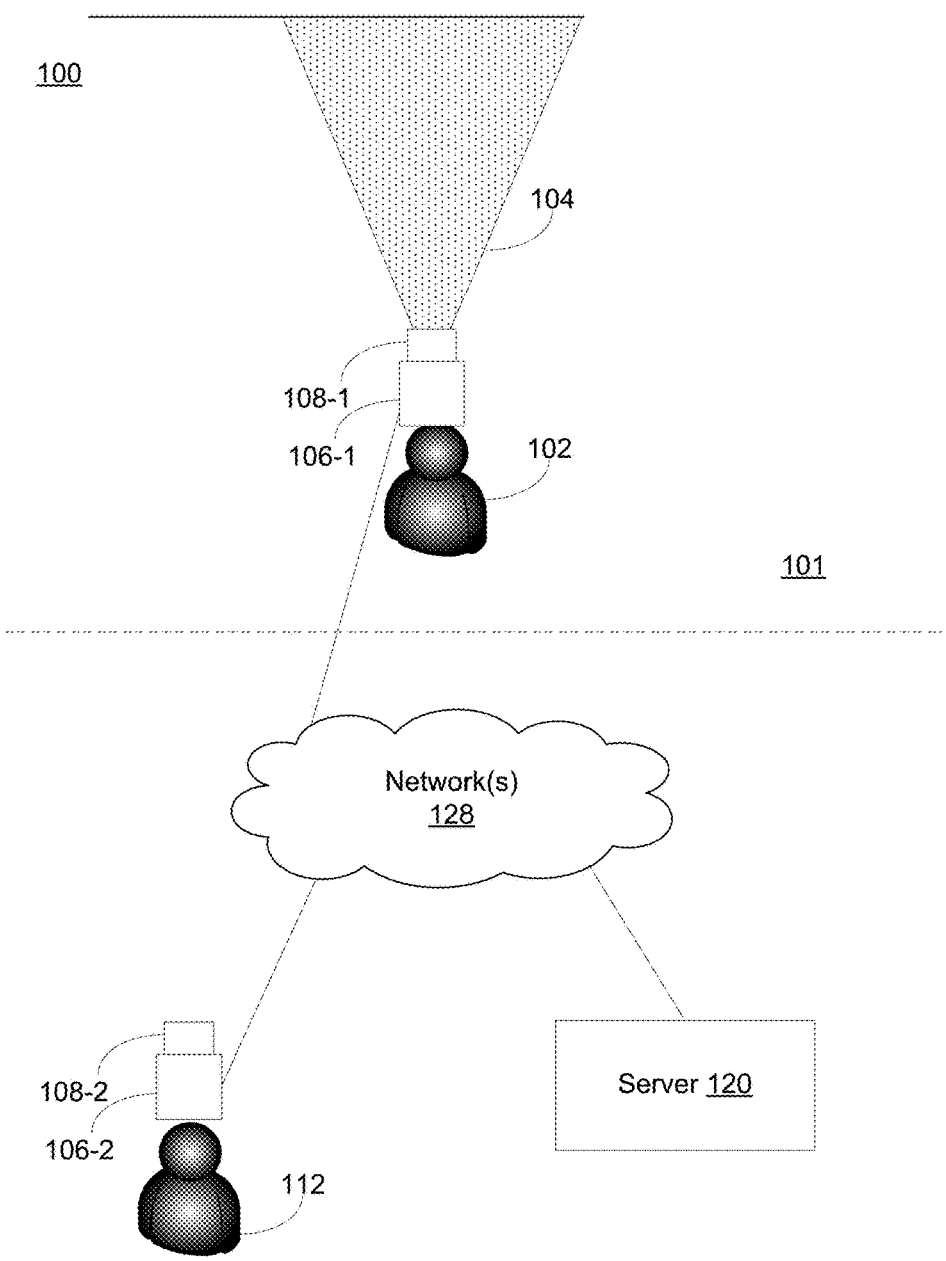
FIG. 1 is a block diagram illustrating a gaze annotation system in accordance with some implementations.

FIG. 1 illustrates a gaze annotation system 100 in accordance with some implementations. The gaze annotation system 100 includes a plurality of computing devices 106, with each of computing devices 106 operatively coupled to a gaze tracking device 108 and scene camera, a server or server system 120, and one or more communication networks 128. FIG. 1 shows two different regions separated by a dashed line. The region above the dashed line, which is referred to in some instances as "local," includes the devices used and/or controlled by one or more local users 102 to provide images and other information for viewing and consumption by and interaction with remote users. In some implementations, the region below the dashed line, which is referred to in some instances as "remote," includes the devices used and/or controlled by one or more remote users 112 to view, consume or interact with the images and other information provided by the local users 102 and/or devices.

The communication network(s) 128 can be any wired or wireless local area network (LAN) and/or wide area network (WAN), such as an intranet, an extranet, or the Internet. It is sufficient that the communication network 128 provides communication capability among the server system 120, the gaze tracking devices 108, and the computing devices 106.

In the gaze annotation system 100, a user 102 (the "local user") in an environment 101 (the "local environment") can view the local environment 101 (e.g., viewing an object in the local environment 101, not shown). A user 112 who is located remotely from the local environment 101 (the "remote user") can view the local environment 101 through the computing device 106-1 local to the local user 102 and local environment 101. The local computing device 106-1 outputs image data corresponding to its view of the local environment 101 to a remote computing device 106-2. The remote computing device 106-2 (the "remote device") is local with respect to the remote user 112 (and thus remote with respect to the local environment 101, local user 102, and computing device 106-1).

The local user 102 has a field of view 104 (e.g., the local user's eyes), and the computing device 106-1 has a field of view. In some implementations, the computing device 106-1 is worn or carried by the local user 102 so that the fields of view of the local user 102 and the scene camera of computing device 106-1 intersect and are directed toward the same direction. For example, the computing device 106-1 may be head mounted to the local user 102. In these implementations, the absolute position of the computing device 106 changes as the local user 102 moves, but the position and distance of the computing device 106 and the scene camera relative to the local user 102 remains the same. Other methods of maintaining the same distance relative to the local user 102 are possible (e.g., mounted on a cart or other wheeled platform propelled by the local user 102).

In some implementations, the computing device 106 includes (e.g., is coupled to) a display and one or more input devices. The computing device 106 outputs images (including videos) from a scene camera corresponding to the image data from the computing device 106 to the display for display to the user. The user uses the input device to input commands in order to manipulate the computing device 106 and communicating with other computing devices 106 via the server 120 and the network 128.

In some implementations, the computing device 106-1 includes a front-facing camera to record a scene. The scene can be the real-world scene or a captured image (included a video or photo). The display on the computing device 106-1 can show the captured image. The gaze tracking device 108 can track the user's gaze on the real-world scene or the captured image and record the gaze information (e.g., as a stream of images). The gaze information can then be processed by the gaze tracking device 108, the computing device 106-1, and/or the server 120. In addition to the gaze information, audio input may be received by the computing device 106. In some implementations, the audio input can be transcribed using ASR and stored as part of the annotation along with the image data representing the scene. The image data and the annotation data can then be shared with the remove device 106-2 via the server 120 and the network 128.

Once the image and the annotation information are received by the remote computing device 106-2, the captured image and the annotations are displayed on the remote computing device 106-2. Using the remote computing device 106-2, the remote user 112 accesses an annotation by fixating on an annotation anchor. The gaze tracking device 108-2 detects the point-of-regard by the remote user 112 and communicates the gaze position to the computing device 106-2. The computing device 106-2 locates the annotation anchor closest to the point-of-regard. The annotation is then played back on the computing device 106-2.

Though FIG. 1 illustrates the server 120 as one computing device, the server 120 can include one or more computing devices for gaze annotation. For example, as further shown in FIG. 2, in some implementations, the server 120 includes one or more messaging servers and one or more gaze tracking servers. The messaging server facilitates communication among the local and remote computing devices 106. In some implementations, the gaze tracking server can perform gaze tracking tasks that require extensive resources and as a result could be too demanding to be performed by the computing devices 106 and/or the gaze tracking device 108.

Figure 2:
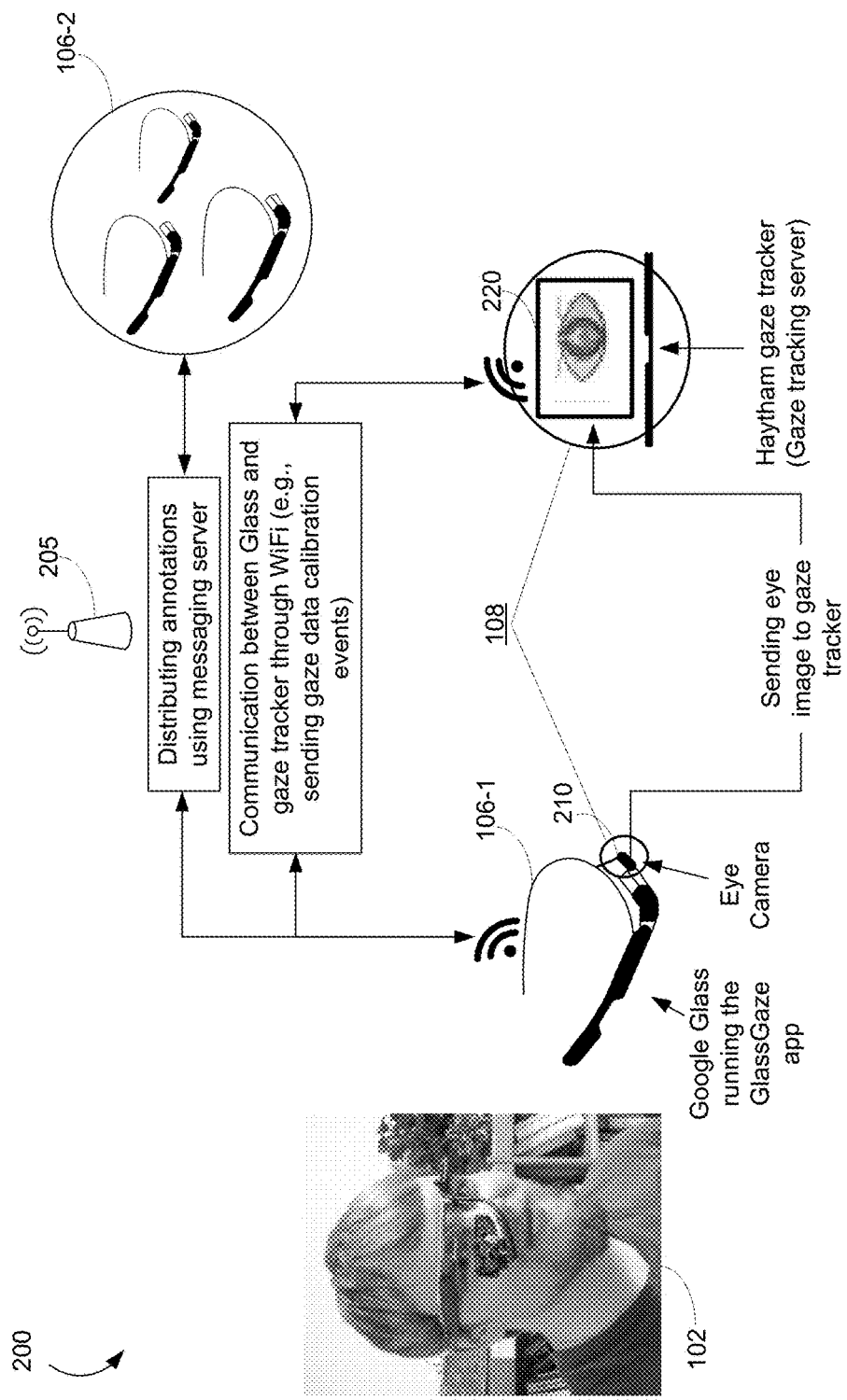
FIG. 2 is a block diagram illustrating various components in a gaze annotation system and the communication among the components in accordance with some implementations.

FIG. 2 illustrates an example gaze annotation system 200 in accordance with some implementations. The example gaze annotation system 200 includes a local computing device 106-1 (e.g., a Google Glass or other electronic device with a heads-up display) worn by a local user 102 and a plurality of remote computing devices 106-2 (e.g., a plurality of Google Glasses) worn by a plurality of remote users. The local computing device 106-1 and the remote computing devices 106-2 are connected through a messaging server 205 via the network 128. In some implementation, the gaze tracking device 108 can include an eye camera 210 and a computing device 220 separated from the eye camera 210.

In some implementations, the separate computing device 220 can perform the gaze estimation task during gaze annotation. Using the separate computing device 220 to perform gaze estimation accommodates the limited processing power and battery life of some instances of the computing devices 106 (e.g., current versions of wearable devices with relatively limited battery capacity). In some implementations, both the messaging server 205 and the gaze tracking server 220 are part of the server 120.

During gaze annotation, in some implementations, the eye camera 210 and a light source (not shown) can be attached to the computing device 106 (e.g., Google Glass or other wearable). The infrared light source can illuminate the eye in order to create good conditions for eye tracking. The image captured from the eye camera 210 is streamed to the computing device 220 (e.g., part of the server 120) running gaze tracking applications (e.g., the open source Haytham gaze tracker). The communication between the eye camera 210 and the computing device 220 can be wired or wireless through the network 128 (e.g., sending gaze data calibration events through WiFi, as shown in FIG. 2, or through wired USB connection, not shown in FIG. 2).

In some implementations, gaze tracking is done using pupil and cornea reflection, and requires a 4-point calibration prior to use. In some implementations, a calibration can use any number of points. During a calibration, the user is asked to look at one point at a time. In some implementations, the eye camera 210 collects data during the calibration and uses homography to map the user's estimated points-of-regard to the actual calibration points. The gaze mapping function is then estimated using homography. Once the gaze is estimated on the computing device 220, the gaze data is sent to back to the computing device 106 (e.g., Google Glass). In some implementations, the computing device 220 performs gaze estimating on the streamed image and communicates the estimated gaze location to a background application running on the computing device 106 (e.g., Google Glass). The background application running on the computing device 106 (e.g., Google Glass) receives the gaze data and allows different applications running on the computing device 106 to communicate with the gaze tracking device 108.

Once a gaze annotation is created on the local computing device 106-1, the messaging server 205 can coordinate the sharing of the gaze annotation with remote computing devices 106-2 (e.g., other Google Glasses) worn by remote users. For example, in some implementations, the sharing of the gaze annotation is implemented using a simple multimedia messaging service running on a cloud node that allows devices to post and retrieve media and associated metadata. Messages can include a binary component, which can be any media type, as well as a string of arbitrary length, which users can use to send metadata with a user-defined protocol in accordance with some implementations.

Figure 3:
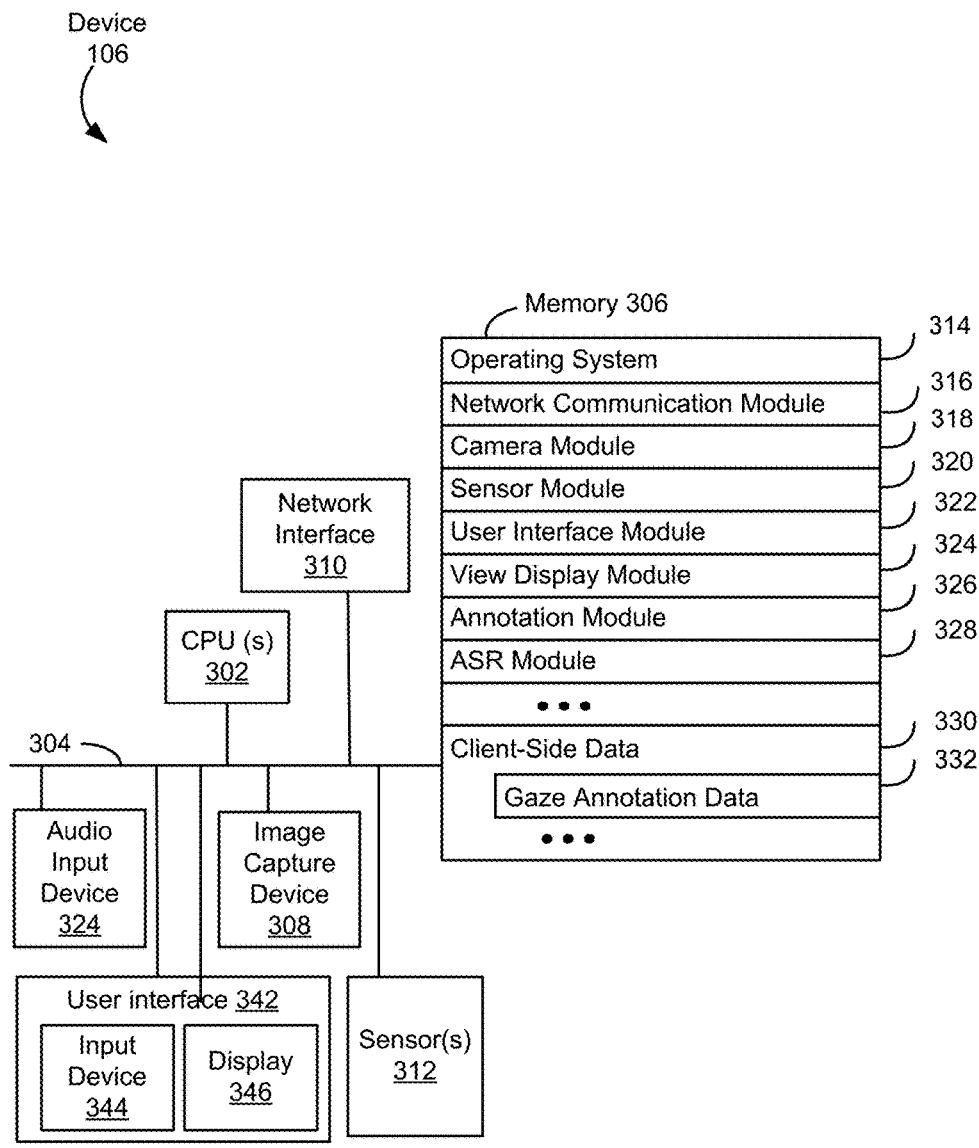
FIG. 3 is a block diagram illustrating a client device for gaze annotation in accordance with some implementations.

FIG. 3 is a block diagram illustrating the computing device 106, in accordance with some implementations. The computing device 106 includes one or more processing units (CPU's) 302, one or more network or other communications interfaces 310, memory 306, a image capture device 308, one or more sensors 312, and one or more communication buses 304, for interconnecting these components in accordance with some implementations. The communication buses 304 optionally include circuitry (sometimes called a chipset) that interconnects and controls communications between system components. In some implementations, the sensors 312 include one or more of: an accelerometer, a gyroscope, and a magnetometer. In some implementations, the image capture device 308 includes a location device (e.g., a GPS receiver) for determining a geographical location of the image capture device 308. In some implementations, the computing device 106 also includes an audio output device (e.g., a speaker, headphones) (not shown) and/or an audio input device 324 (e.g., a microphone). In some implementations, the computing device 106 also includes a user interface 342 comprising a display device 346 and one or more input devices 344. In some implementations, the input device(s) 344 include one or more of: a keyboard, a mouse, a touch-sensitive surface (e.g., a track pad, a touch-sensitive display), a joystick, and a trackball.

Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302. Memory 306, or alternatively the non-volatile memory device(s) within memory 306, comprises a non-transitory computer readable storage medium. In some implementations, memory 306 or the computer readable storage medium of memory 306 store the following programs, modules and data structures, or a subset thereof, including operating system 314, communication module 316, camera module 318, sensor module 320, user interface module 322, view display module 324, annotation module 326, and ASR module 328, among others.

The operating system 314 includes procedures for handling various basic system services and for performing hardware dependent tasks.

The communication module 316 facilitates communication with other devices (e.g., the gaze tracking device 108), computers (e.g., the server 120), and systems via the one or more communication network interfaces 310 (wired or wireless) and one or more communication networks, such as the Internet, other wide area networks, local area networks, metropolitan area networks, and so on. The communication module 316 may be implemented by using any possible manner, such as a WiFi module, Bluetooth communication, and/or optical fiber communication, among others.

The camera module 318 captures images (e.g., photos and/or videos) using the image capture device 308, encodes the captured images into image data, displays the image data on the display 346, and send the image data to the server system 120 via the network communication module 316 for display at the remote computing device.

The sensor module 320 obtains readings from sensors 312, processes the readings into sensor data, and transmits the sensor data to the server system 120.

The user interface module 322 processes user inputs received on the input devices 344 and/or the audio input device 324 and instructs the computing device 106 to perform operations (e.g., record gaze annotations, playback gaze annotations, edit gaze annotations etc.). The user interface module 322 also receives control signals from the remote computing device (through the server system 120) and instructs the computing device 106 to perform operations in accordance with the control signals.

The view display module 324 receives data (e.g., sensor data from the image capture device 308 and the sensory device 312, annotation data received from the annotation module 326, or visualization data from the server 120 generated from data from the computing device 106), processes the data, and displays the data as visualizations of fields of view and the annotation on the display 346. The view display module 324 also displays a user interface for issuing commands to the computing device 106, and optionally, interacting with the displayed visualizations.

The annotation module 326 captures gaze annotations, generates annotation anchors, associates the annotations with deictic gaze markers, and sends the annotation information to the display 346 via the view display module 324.

The automatic speech recognition (ASR) module 328 receives audio input from the audio input device 324, transcribes the audio input, analyzes the audio input so that deictic gaze gestures can be recognized, extracted as annotations, and aligned with the images captured by the image capture device 308.

In addition to modules, the memory 306 also stores client-side data 330. In some implementations, the client-side data 330 include gaze annotation data 332. The gaze annotation data 332 can be objects (e.g., Json objects) that include the image captured for annotation, the points-of-regard, annotation anchors, deictic gaze markers, and the spoken annotation in accordance with some implementations.

Each of the above identified elements may be stored in one or more of the previously mentioned memory devices, and each of the modules or programs corresponds to a set of instructions for performing a function described above. The set of instructions can be executed by one or more processors (e.g., the CPUs 302). The above identified modules or programs (i.e., sets of instructions) need not be implemented as separate software programs, procedures or modules, and thus various subsets of these modules may be combined or otherwise re-arranged in various implementations. In some implementations, memory 306 may store a subset of the modules and data structures identified above. Furthermore, memory 306 may store additional modules and data structures not described above.

Although FIG. 3 shows a computing device 106 creating and/or sharing gaze annotation, FIG. 3 is intended more as functional description of the various features which may be present in a computing device than as a structural schematic of the implementations described herein. In practice, and as recognized by those of ordinary skill in the art, items shown separately could be combined and some items could be separated.

Figure 4:
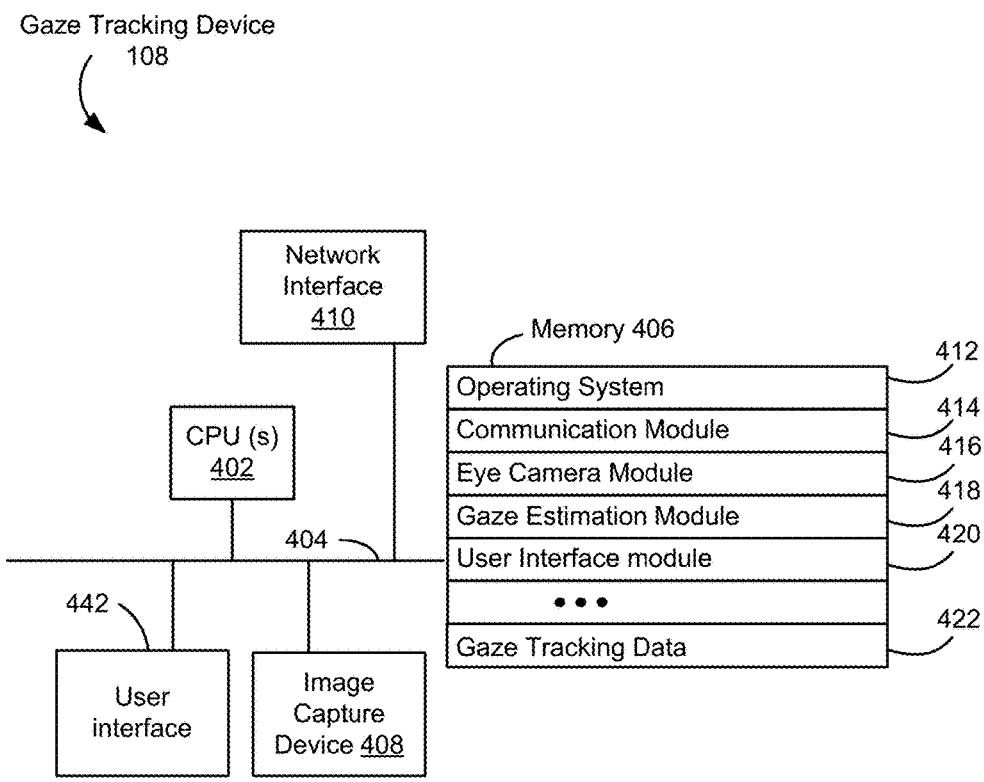
FIG. 4 is a block diagram illustrating a gaze tracking device in accordance with some implementations.

FIG. 4 is a block diagram illustrating the gaze tracking device 108, in accordance with some implementations. The gaze tracking device 108 includes one or more processing units (CPU's) 402, one or more network or other communications interfaces 410, memory 406, a image capture device 408, and one or more communication buses 404, for interconnecting these components in accordance with some implementations. The communication buses 404 optionally include circuitry (sometimes called a chipset) that interconnects and controls communications between system components. The gaze tracking device 108 may include a user interface 442. The user interface 442 can include a display device and one or more input devices. In some implementations, the input device(s) include one or more of: a keyboard, a mouse, a touch-sensitive surface (e.g., a track pad, a touch-sensitive display), a joystick, a trackball, and/or one or more buttons.

Memory 406 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 406 may optionally include one or more storage devices remotely located from the CPU(s) 402. Memory 406, or alternatively the non-volatile memory device(s) within memory 406, comprises a non-transitory computer readable storage medium. In some implementations, memory 406 or the computer readable storage medium of memory 406 store the following programs, modules and data structures, or a subset thereof, including operating system 412, communication module 414, eye camera module 416, gaze estimation module 418, user interface module 420, and gaze tracking data 422, among others.

The operating system 412 includes procedures for handling various basic system services and for performing hardware dependent tasks.

The communication module 414 facilitates communication with other devices (e.g., the computing devices 106), computers (e.g., the server 120), and systems via the one or more communication network interfaces 410 (wired or wireless) and one or more communication networks, such as the Internet, other wide area networks, local area networks, metropolitan area networks, and so on. The communication module 414 may be implemented by using any possible manner, such as a WiFi module, Bluetooth communication, and/or optical fiber communication, among others.

The eye camera module 416 captures images of the user's eye using the image capture device 408, encodes the captured images into eye image data, and sends the streamed eye image data to the computing device 106 via the communication module 414 for gaze annotation.

The gaze estimation module 418 performs gaze estimation on the streamed eye image data received from the image capture device 408 and communicates the estimated gaze location to computing device 106 via the communication module 414.

The user interface module 420 processes user inputs received through the user interface 442, and instructs the gaze tracking device 108 to perform operations accordingly. The user interface module 420 also receives control signals from the other computing device (e.g., the computing device 106) and instructs the gaze tracking device 108 to perform operations in accordance with the control signals.

In some implementations, the gaze tracking data 422 stores the captured eye image received from the image capture device 408 and/or the estimated gaze locations.

Each of the above identified elements may be stored in one or more of the previously mentioned memory devices, and each of the modules or programs corresponds to a set of instructions for performing a function described above. The set of instructions can be executed by one or more processors (e.g., the CPUs 402). The above identified modules or programs (i.e., sets of instructions) need not be implemented as separate software programs, procedures or modules, and thus various subsets of these modules may be combined or otherwise re-arranged in various implementations. In some implementations, memory 406 may store a subset of the modules and data structures identified above. Furthermore, memory 406 may store additional modules and data structures not described above.

Although FIG. 4 shows a gaze tracking device 108 estimating point-of-regard, FIG. 4 is intended more as functional description of the various features that may be present in a computing device than as a structural schematic of the implementations described herein. In practice, and as recognized by those of ordinary skill in the art, items shown separately could be combined and some items could be separated.

Figure 5:
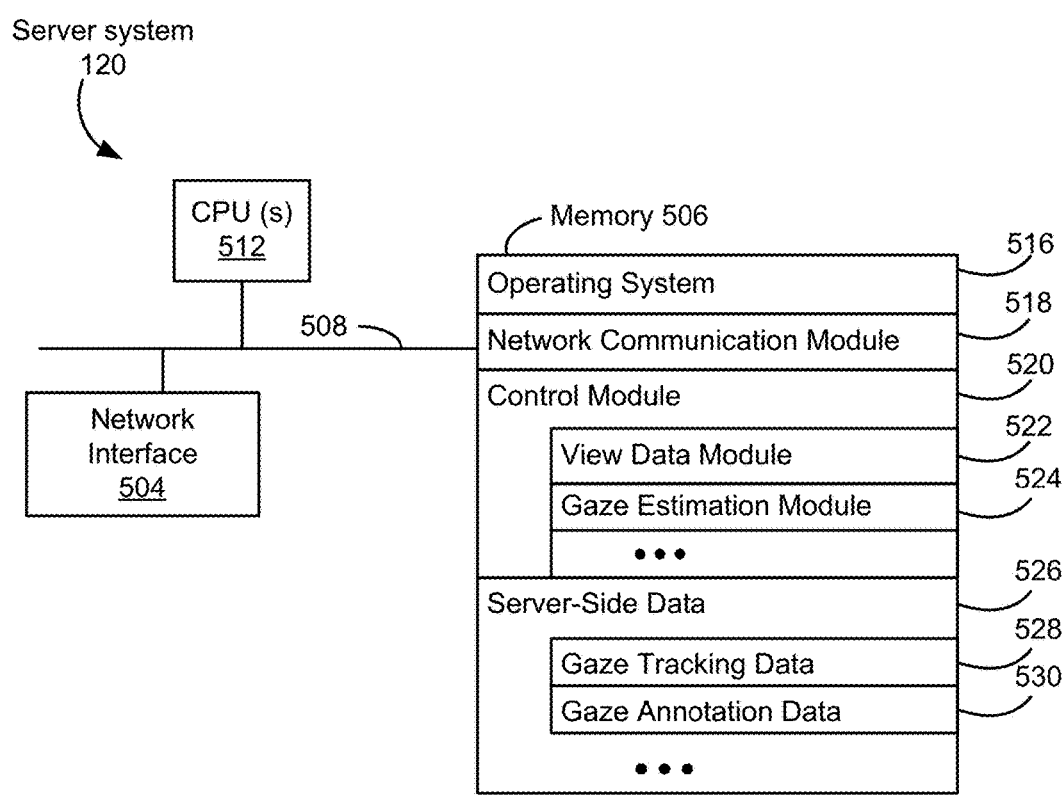
FIG. 5 is a block diagram illustrating a server system in accordance with some implementations.

FIG. 5 is a block diagram illustrating the server system 120 in accordance with some implementations. The server system 120 may include one or more processing units (CPUs) 512, one or more network interfaces 504 (e.g., including an I/O interface to one or more computing devices 106 and an I/O interface to one or more gaze tracking devices 108), one or more memory units 506, and one or more communication buses 508 for interconnecting these components (e.g. a chipset).

The memory 506 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 506, optionally, includes one or more storage devices remotely located from one or more processing units 512. The memory 506, or alternatively the non-volatile memory within the memory 506, includes a non-transitory computer readable storage medium. In some implementations, the memory 506, or the non-transitory computer readable storage medium of the memory 506, stores the following programs, modules, and data structures, or a subset or superset thereof:

- operating system 516 including procedures for handling various basic system services and for performing hardware dependent tasks;
- network communication module 518 for connecting server system 120 to other computing devices (e.g., the computing devices 106 and/or the gaze tracking device 108) connected to one or more networks 128 via one or more network interfaces 504 (wired or wireless);
- control module 520, which provides server-side data processing (e.g., user account verification, sending and/or receiving data, instant messaging, and social networking services, among others):
  - view data module 522, which processes the data received from the computing device 106 to generate visualization data, then sends the visualization data to the computing device 106 for display;
  - The gaze estimation module 524 performs gaze estimation on the streamed eye image data received from the gaze tracking device 108 and communicates the estimated point-of-regard to computing device 106 via the network communication module 518; and
- The server-side data 526, which stores data used by the control module 520 for processing:
  - gaze tracking data 528 stores the captured eye image received from the image capture device 408 and/or the estimated gaze locations;
  - gaze annotation data 530 stores gaze annotation data as objects (e.g., Json objects) including the image captured for annotation, the point-of-regard, annotation anchor and deictic gaze markers, and the spoken annotation.

Each of the above identified elements may be stored in one or more of the previously mentioned memory devices, and each of the modules or programs corresponds to a set of instructions for performing a function described above. The set of instructions can be executed by one or more processors (e.g., the CPUs 512). The above identified modules or programs (i.e., sets of instructions) need not be implemented as separate software programs, procedures or modules, and thus various subsets of these modules may be combined or otherwise re-arranged in various implementations. In some implementations, memory 506 may store a subset of the modules and data structures identified above. Furthermore, memory 506 may store additional modules and data structures not described above.

Although FIG. 5 shows a server 120, FIG. 5 is intended more as functional description of the various features which may be present in a computing device than as a structural schematic of the implementations described herein. In practice, and as recognized by those of ordinary skill in the art, items shown separately could be combined and some items could be separated.

Figure 6:
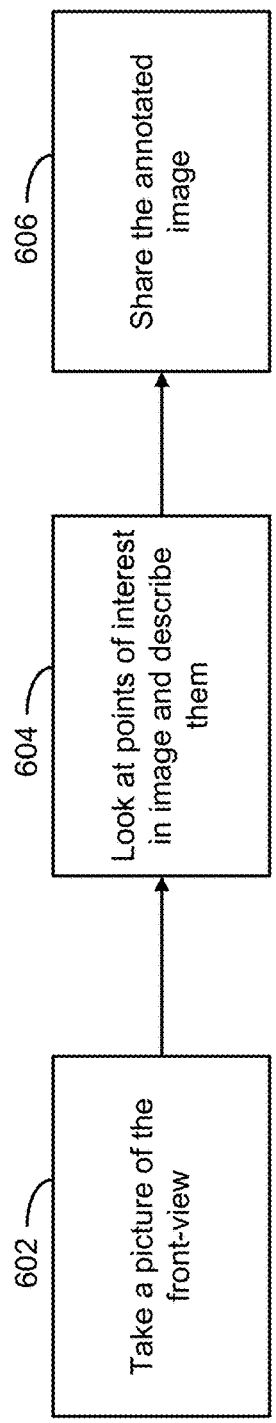
FIG. 6 illustrates an interaction flow for creating a gaze annotation in accordance with some implementations.
Figure 7:
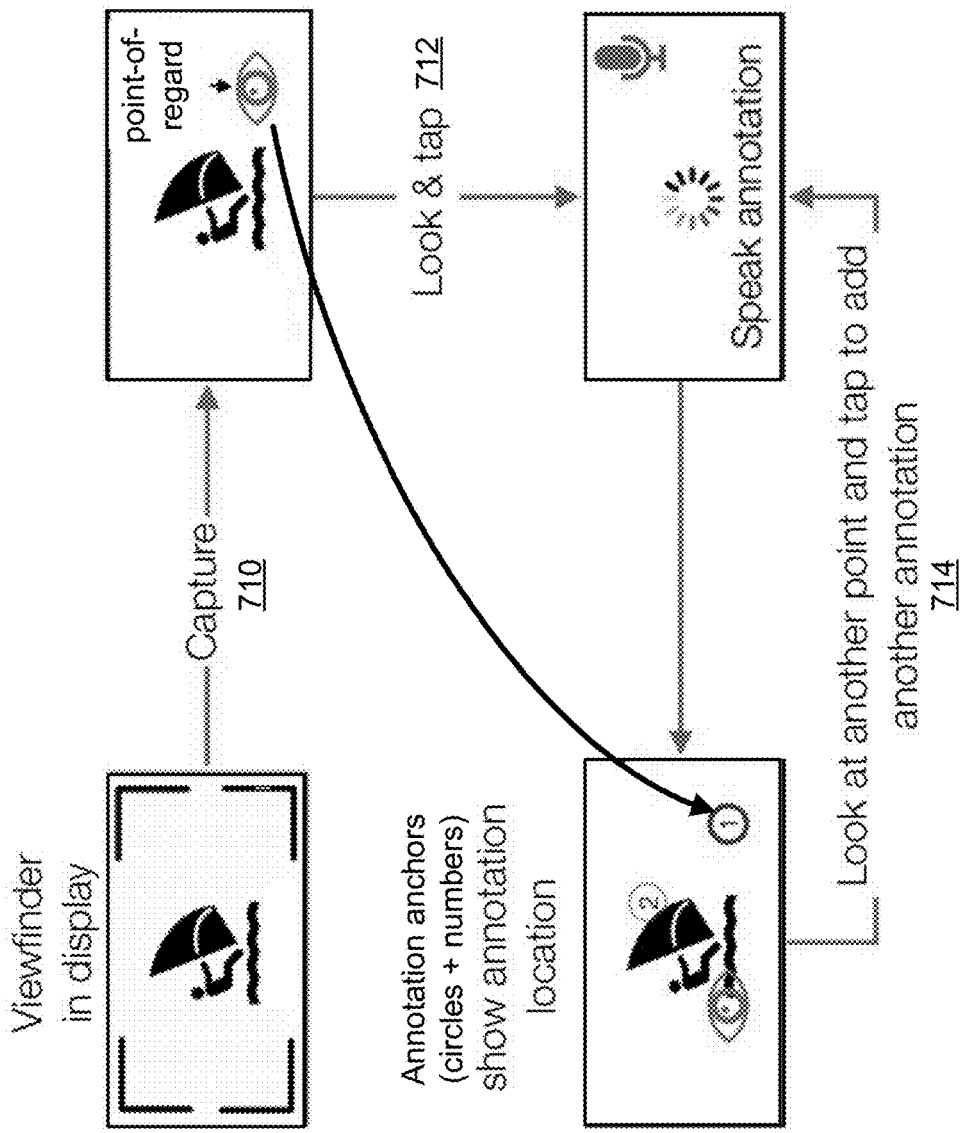
FIG. 7 illustrates an interactive flow chart for creating a gaze annotation in accordance with some implementations.
Figure 8:
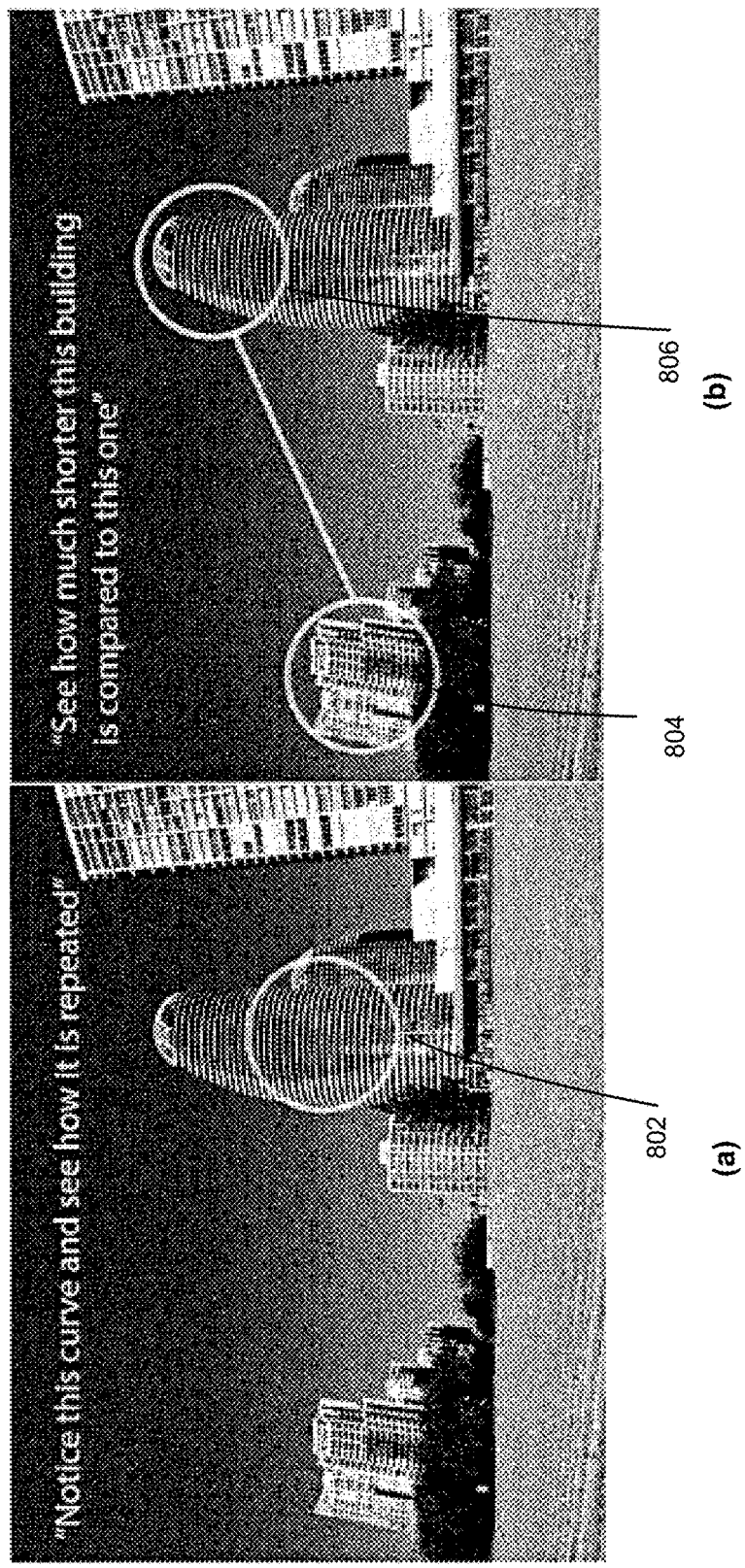
FIG. 8 illustrates examples of creating gaze annotation with visualizations of deictic gaze gestures in accordance with some implementations.
Figure 9:
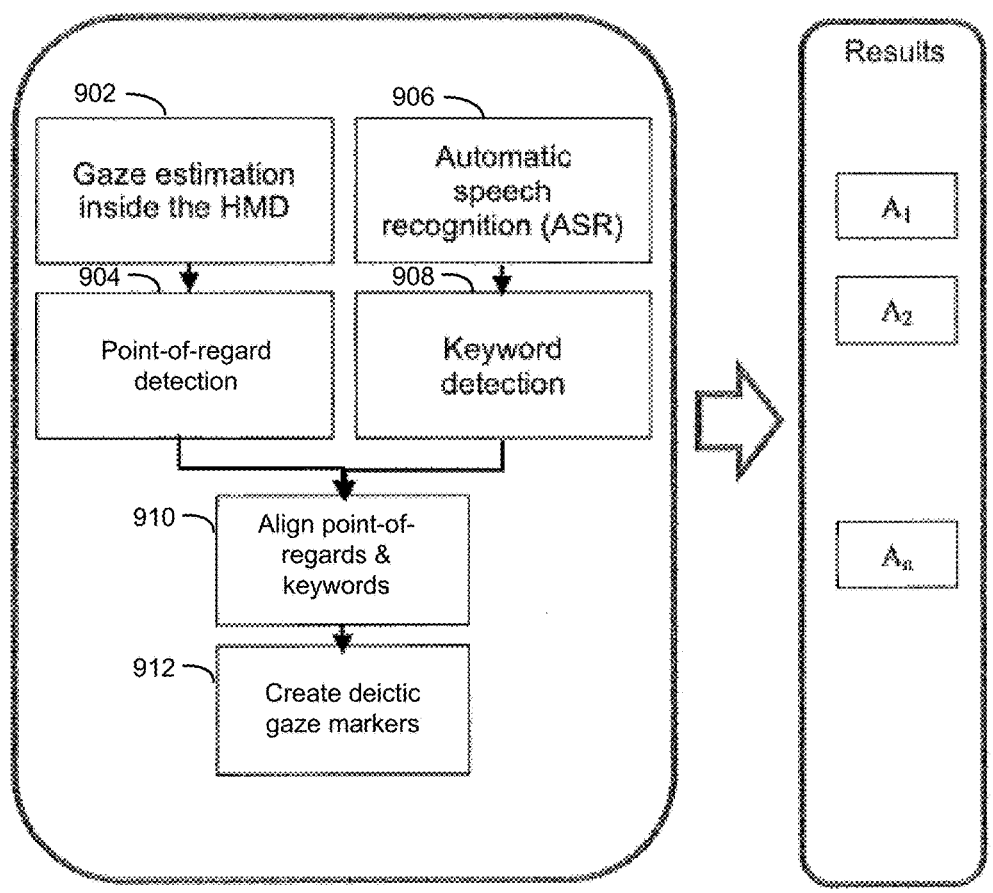
FIG. 9 illustrates a flow chart of gaze annotation creation by detecting deictic gaze gestures within captured photo in accordance with some implementations.
Figure 10:
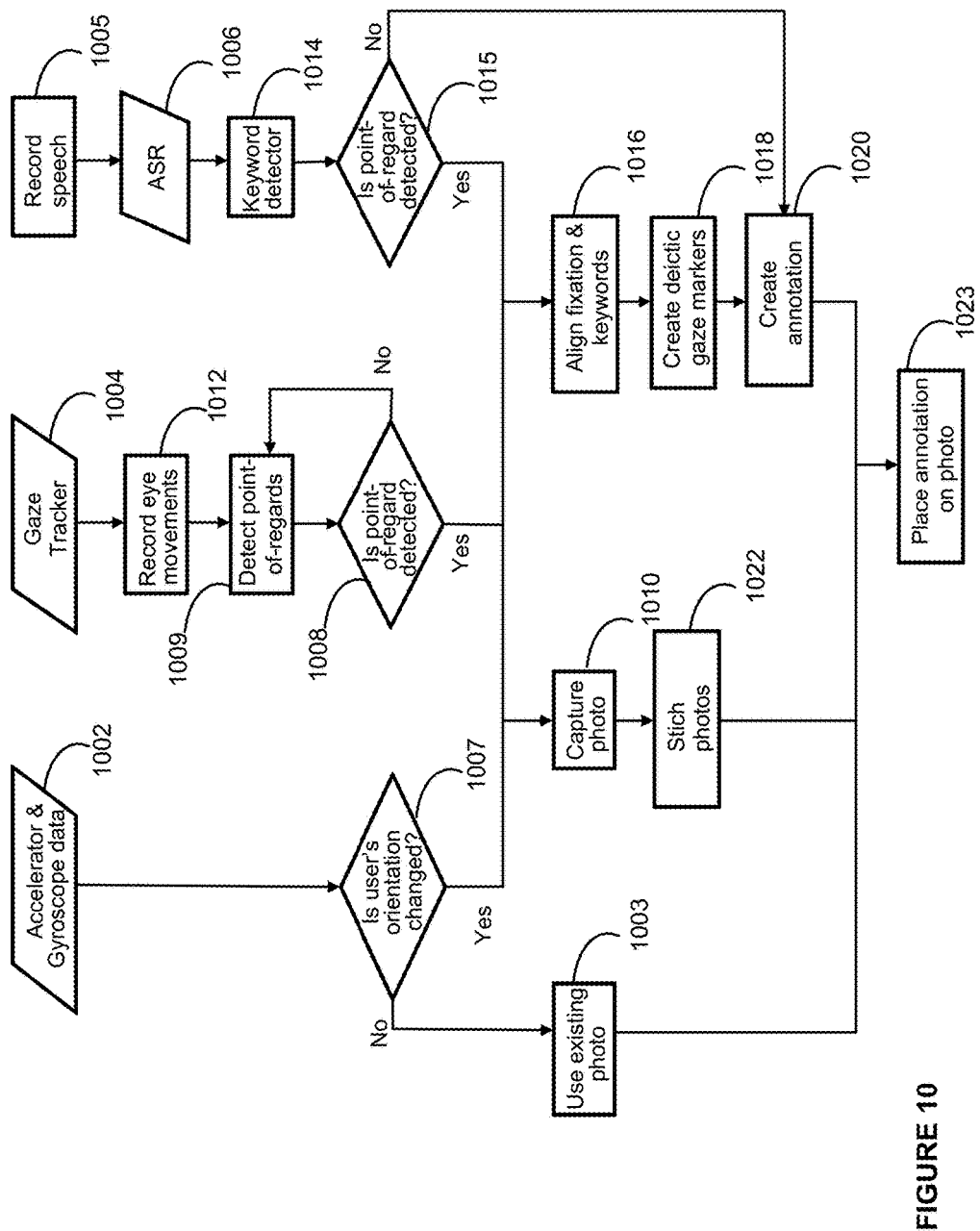
FIG. 10 illustrates a flow chart of gaze annotating a real-world scene with detection of deictic gaze gestures in accordance with some implementations.
Figure 11:
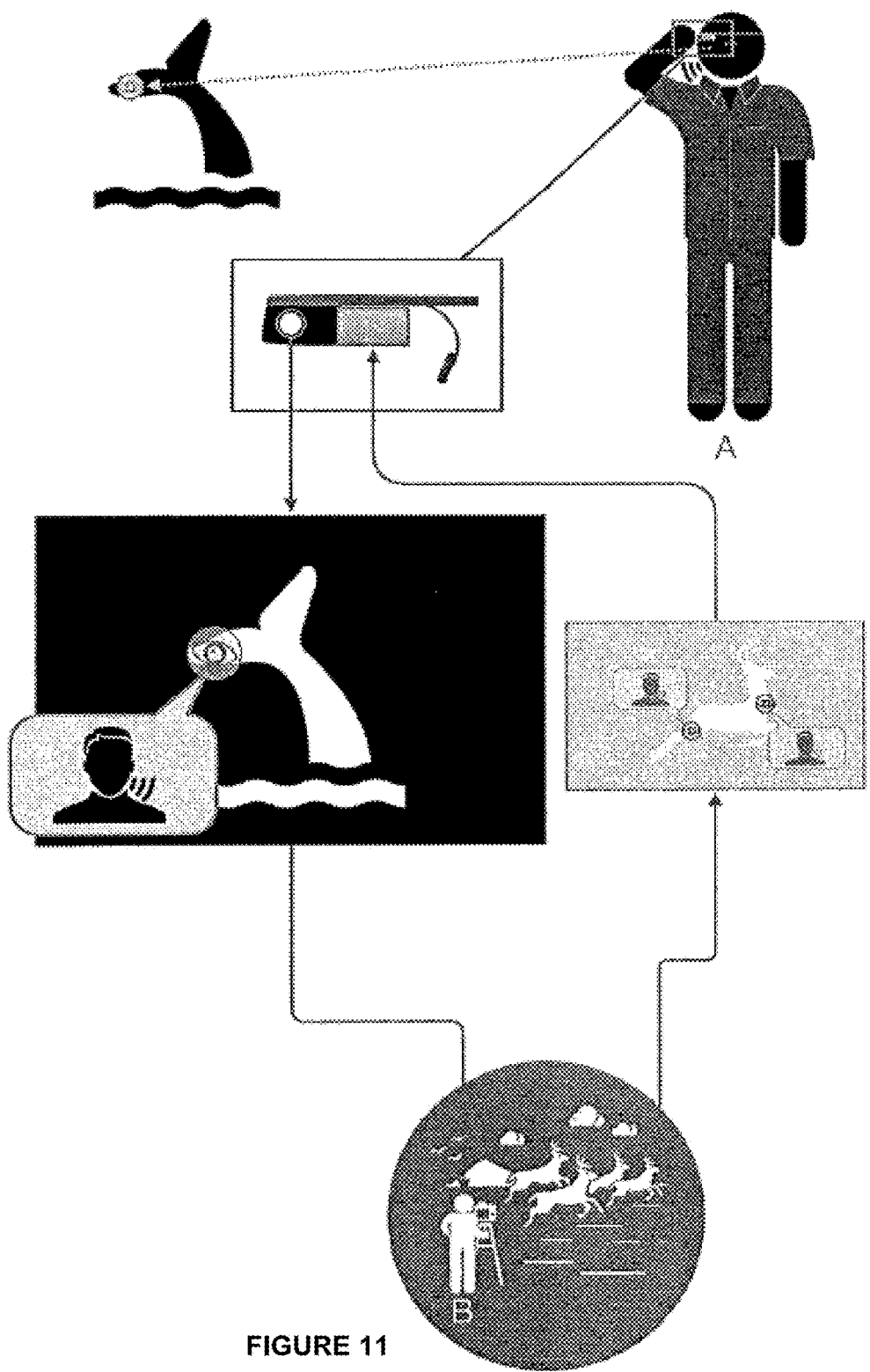
FIG. 11 illustrates sharing a gaze annotated view in accordance with some implementations.

In some implementations, the gaze annotation systems illustrated in FIGS. 1-5 can be used to annotate both images and real-world scene. As stated above, when making an annotation, the user looks at different points in his or her field of view, either in the real-world or in a captured image, and speaks the annotation. FIGS. 6-7 illustrate creation of gaze annotation within captured images in accordance with some implementations. FIG. 8 illustrates examples of visualizations of deictic gaze gestures captured by the gaze tracking device 108, and speech recognition during gaze annotation. Utilizing the deictic gaze gestures, FIGS. 9-10 illustrate deictic gaze annotation creation of captured images and a real-world scene respectively. After the gaze annotation creation, FIG. 11 illustrates sharing a gaze annotated view.

Turning now to FIG. 6, in some implementations, when creating an annotated single image, a local user first takes (602) a picture of the user's field of view 104 using the scene camera included in the local device 106-1 as shown in FIG. 1. The captured view by the local computing device 106-1 can be displayed on the display of the local computing device 106-1. The user decides where to add an annotation by looking at (604) points of interest in the displayed image and speaks the annotation. Both the gaze location and the spoken description can be captured and used in the annotation. The annotated image can then be shared (606).

As further shown in FIG. 7, the benefit of displaying the captured view on the display of the local computing device 106-1 during gaze annotation is that the gaze annotation system 100 can superimpose the user's gaze onto the captured image so that the user can see where the annotation anchor will be placed in the image before creating the gaze annotation. For example, to annotate a scene, the user instructs the local device 106-1 to start a new annotation. When the instruction (e.g., a verbal command to Google Glass) is received by the local device 106-1, the local device 106-1 captures (710) the scene and displays it to the user. The user decides where to add an annotation by fixating on a point in the image. The gaze tracking device 108-1 detects the point-of-regard and communicates it to the computing device 106-1. When the computing device 106-1 receives the estimated point-of-regard, and its location is used as a hotspot for the annotation. The hotspot is visualized as an annotation anchor that is inserted into the image. This anchor alerts viewers about the presence and location of an annotation. The gaze position as marked by the anchor is superimposed on the displayed view.

Upon seeing a representation of the point-of-regard in the display, the user can instruct (712) the local device 106-1 (e.g., tapping on Google Glass) to add an annotation in accordance with some implementations. A new screen, such as displaying a microphone speaker, can be shown to the user to indicate that the device 106-1 is waiting for voice input. An annotation anchor, such as a circled number ①, showing the annotation location, can be inserted on the point where the user fixated on when giving instruction. The user's speech is transcribed or recorded and attached as meta-data to the captured photo in accordance with some implementations. The captured image, the annotation anchor, and the transcribed voice input can then be stored as objects (e.g., Json objects) for sharing.

After creating one gaze annotation, the same process described above can be repeated when the user looks (714) at another point and instruct (e.g., by tapping on Google Glass) the device 106-1 to add another annotation represented by another annotation anchor (e.g., circled number ②)) at showing another annotation anchor in the same captured image. In some implementations, when multiple gaze annotations are added in close proximity, the annotation anchors can be adjusted in location not to overlap or clutter the view.

In some implementations, deictic gaze gesture analysis is performed on the gaze annotation shared among the computing devices 106. Research has shown that when looking and describing a visual scene, people have a tendency to look at what they talk about. This natural gaze behavior we call deictic gaze gesture. A deictic gaze gesture can be as simple as looking at an item while uttering a deictic reference, such as "this," "here," "there." In this case, the deictic gaze gesture is a pointing gesture. However, deictic gaze gestures also can convey more complex information such as relationships. Take for instance the phrase "If you follow this line from the tree to the house," the deictic gaze gesture would be an implicit reference line between the tree and the house. Deictic gaze gestures are visualized as deictic gaze markers superimposed on the annotated image.

In some implementations, deictic gaze gestures are analyzed from recorded speech and eye movements. Eye movements are recorded with an eye camera (e.g., the eye camera 210 in FIG. 2), and the speech is recorded by audio input devices (e.g. the audio input device 324). The speech can be transcribed using ASR. If a keyword indicative of a deictic reference is found, the gaze data is analyzed for points-of-regard that can be align by time or, in a simpler case, by order of identified deictic references. Each identified deictic reference is visualized using deictic gaze markers. Next, the transcribed text or speech signal is analyzed to find keywords indicative of a relationship between two reference points. If a relationship appears to exist, a visualization representing the relationship is added to the deictic gaze markers. When a gaze annotation containing visual gaze markers is played back, all markers can become visible at once, or they can be shown when the corresponding keyword is played back.

FIG. 8 shows examples of deictic gaze markers within a captured image. In FIG. 8(*a*), the deictic gaze gesture would in this simple case be a pointing gesture. When describing a scene as shown in FIG. 8(*a*), the word "this" is found when analyzing the speech "Notice this curve and see how it is repeated." The deictic gaze marker 802 can be aligned using time and/or order of the deictic reference of "this" to locate the curved building in the scene. In some implementations, transcribed text can be displayed as part of the visualization. For example, in FIG. 8(*a*), the text "Notice this curve and see how it is repeated" can become visible in addition to the annotation anchor 802 in the image when the annotation is played back.

FIG. 8(*b*) illustrates a more complex deictic gaze gesture visualization in accordance with some implementations. When analyzing the speech, "See how much shorter this building is compared to this one," multiple keywords "this building" and "this one" can be found. After aligning points-of-regard, multiple deictic gaze markers 804 and 806 and a line drawn between 804 and 806 are displayed to indicate the deictic gaze gestures and the relationship between two locations. In some implementations, as part of the visualization, transcribed text, such as "See how much shorter this building is compared to this one" can become visible in addition to the deictic gaze markers 804 and 806 in the image when the annotation is played back.

It should be noted that the deictic gaze markers as shown in FIG. 8 is not the same as the annotation anchors as shown in FIG. 7. The annotation anchors as shown in FIG. 7 are displayed so that the viewer knows that there are gaze annotations within the captured scene. The deictic gaze markers as shown in FIG. 8 aim to enhance the speech with gaze information in order to communicate with higher precision. In some implementations, the visual appearance of deictic gaze maker is the same as or similar to the appearance of an annotation marker.

FIGS. 9-10 illustrate the method of creating gaze annotation that includes deictic gaze gestures while annotating images and a real-world scene respectively. FIG. 9 illustrates an example flow 900 of creating gaze annotation by detecting deictic gaze gestures within a captured image in accordance with some implementations. In some implementations, at a computing device (e.g., the local computing device 106-1) that is coupled with a scene camera (e.g., the image capture device 308), a display (e.g., the display 346), and a gaze tracking device (e.g., the gaze tracking device 108), the computing device first receives and displays an image from the scene camera, so that it can be viewed by a user of the computing device. In some implementations, as shown in FIG. 7, the image is displayed in a viewfinder to the user. In some implementations, as shown in FIG. 2, the image is displayed in the display 346 (e.g., the display of Google Glass).

While displaying the image in the display to the user, the gaze tracking device estimates (902) point-of-regard of the user, the audio input device (e.g., the audio input device 324 as part of the computing device 106) receives audio inputs, and the computing device performs ASR (906) and keyword detection (908) for deictic references. In response to detecting (904) speech, the gaze tracker records a set of points-of-regard for the continuation of the speech. In some implementations, the computing device captures the image with the scene camera and displays the captured image. The identified keywords and the points-of-regard are aligned (910), in some implementations the alignment can be done using time information from the speech and points-of-regard to match keywords with points-of-regard. The identified deictic gaze gesture can be visualized (912) as deictic gaze markers, as shown in FIGS. 7-8. In some implementations, the created gaze annotations $A_1, A_2, \ldots, A_n$ can be stored as objects (e.g., Json objects) and shared with other users via the server 120 and the network 128 as further illustrated in FIG. 11 below.

FIG. 10 illustrates an example flow 1000 of creating gaze annotations that includes deictic gaze gestures of a real-world scene in accordance with some implementations. Similar to creating gaze annotation of a captured image, in some implementations, at a computing device (e.g., the local computing device 106-1) that is coupled with a camera (e.g., the image capture device 308), a display (e.g., the display 346), a gaze tracking device (e.g., the gaze tracking device 108), and a location device (e.g., the sensor(s) 312), the computing device first receives and displays an image from the camera, so that it can be viewed by a user of the camera. In some implementations, as shown in FIG. 7, the image is displayed in a viewfinder to the user. In some implementations, as shown in FIG. 2, the image is displayed in the display 346 (e.g., the display of Google Glass).

However, different from the flow in FIG. 9, the scene used for annotation does not need to be first captured and displayed in the display of the computing device. In the real-world gaze annotation scenario, the process for creating annotations is different, since even a wide-angle camera seldom can capture the entire view of a mobile person. A person might turn his or her head as well as the eyes when referring to a new object. In order to create a gaze annotation of a real-world scene, the user behaves in a similar manner as when creating an annotation in a captured image, he or she speaks out the annotation while looking at objects of interest. The difference is that he or she looks at the real-world scene rather than a captured scene. Thus, the gaze tracking device estimates the point-of-regard of the user's field-of-view of the real-world and translate the coordinates of the point-of-regard to an image captured by the computing device of the real-world scene.

During data capture stage of the real-world scene scenario, the eye camera (e.g., the eye camera 210) records a stream of eye images. The gaze tracker 1004 (e.g., the gaze tracker 220) performs gaze estimation from the recorded (1012) eye movements as a stream of eye images in order to detect (1009) and determine (1008) if a point-of-regard has been detected. In addition to capturing the eye images, the computing device 106 captures (1010) video clip or a series of photos, as well as records (1005) the spoken voice. The computing device 106 performs ASR (1006) and keyword detection (1014) for deictic references. In some implementations, the data can be analyzed in real-time looking for relative co-occurrence of points-of-regard and deictic references. Based on the existence of the co-occurrence of points-of-regard and deictic references, the computing device 106 determines (1015) whether the point-of-regard has been detected. If the computing device 106 does not detect a point-of-regard due to the lack of co-occurrence, the recorded speech can still be used to create (1020) annotation. On the other hand, if the computing device detects a point-of-regard, the point-of-regard is aligned (1016) with keywords corresponding to deictic references as described above with respect to FIG. 9, and deictic gaze markers are created (1018). The created deictic gaze markers can be visualized as shown in FIGS. 7-8.

As used herein, "point-of-regard" includes the knowledge of where a user looks at a given time. A point-of-regard can be calculated using various methods. Fixation detection can be one of them, but it could also be a single gaze estimation from the gaze tracker 220. In some implementations, a point-of-regard is estimated from a single gaze data point at a specific point in time. In some other implementations, a point-of-regard is estimated from a stream of gaze data points from which fixations are detected.

In some implementations, the system obtains sensory data from accelerator and gyroscope (e.g., the sensors 312). After obtaining the sensory data, the system determines (1007) if the user's orientation has changed. Every time the user's orientation has changed and/or a point-of-regard has been detected, the system captures (1010) an image. On the other hand, if the user's position including the orientation has not change, the system uses (1003) the existing image. If multiple images have been captured during an annotation, these images are stitched (1022) into one image using location information.

Combining the sensory information, the captured image, the identified objects information, and the speech, annotations are created and images are stitched. The annotations are placed (1023) on the stitched images as shown in FIGS. 7-8. Once the annotated images are created, they can be stored and accessed by other users, as further illustrated in FIG. 11 below.

FIG. 11 illustrates sharing a gaze annotated image in accordance with some implementations. As shown in FIG. 11, Person A looks at a scene and talks about it. The gaze annotation system associates Person A's speech with fixated points-of-regard as described above with respect to FIGS. 6-10. The gaze annotated image and/or video can be shared with Person B, who can see the annotated view of Person A via the display of the remote computing device.

As explained above with respect to FIG. 2, objects representing gaze annotations can be stored after creation. Another user can access the objects via the server 120 and thus access the gaze annotation when the image is shown in the remote computing device 106-2 by looking at an annotation anchor. This action will playback the recorded annotation using either text-to-speech (TTS) or the original voice recording. Gaze annotations can be either shared with individuals when each user has a unique id or it can be shared with a group in real-time during a video conferencing, or shared within the same physical space, as the annotation was captured. For this purpose, the location and orientation of the person creating an annotation, such as the location and orientation of Person A in FIG. 11, are stored with other meta-data.

Figure 12A:
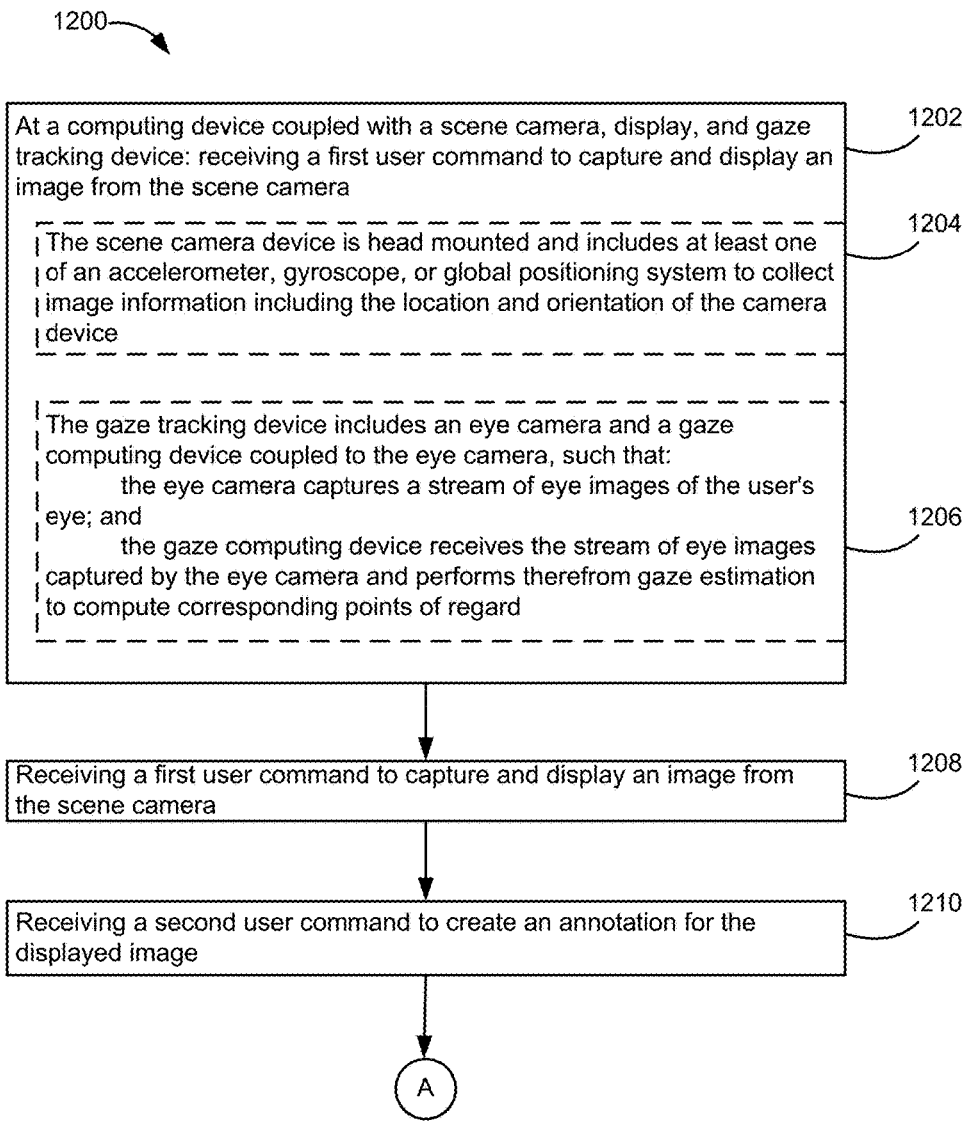
FIGS. 12A-12C illustrate a flow diagram of a gaze annotation method for an image in accordance with some implementations.
Figure 12B:
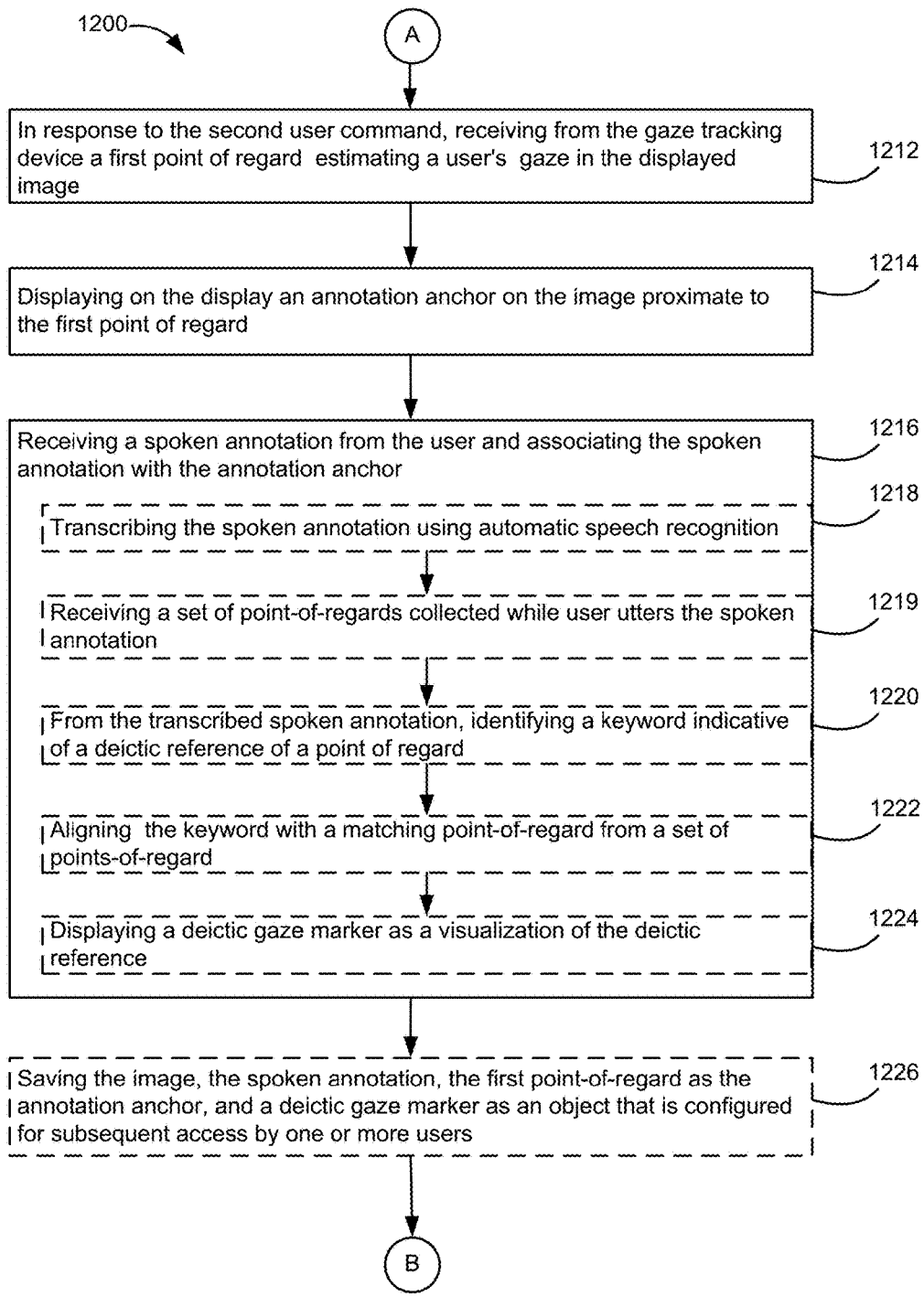
Figure 12C:
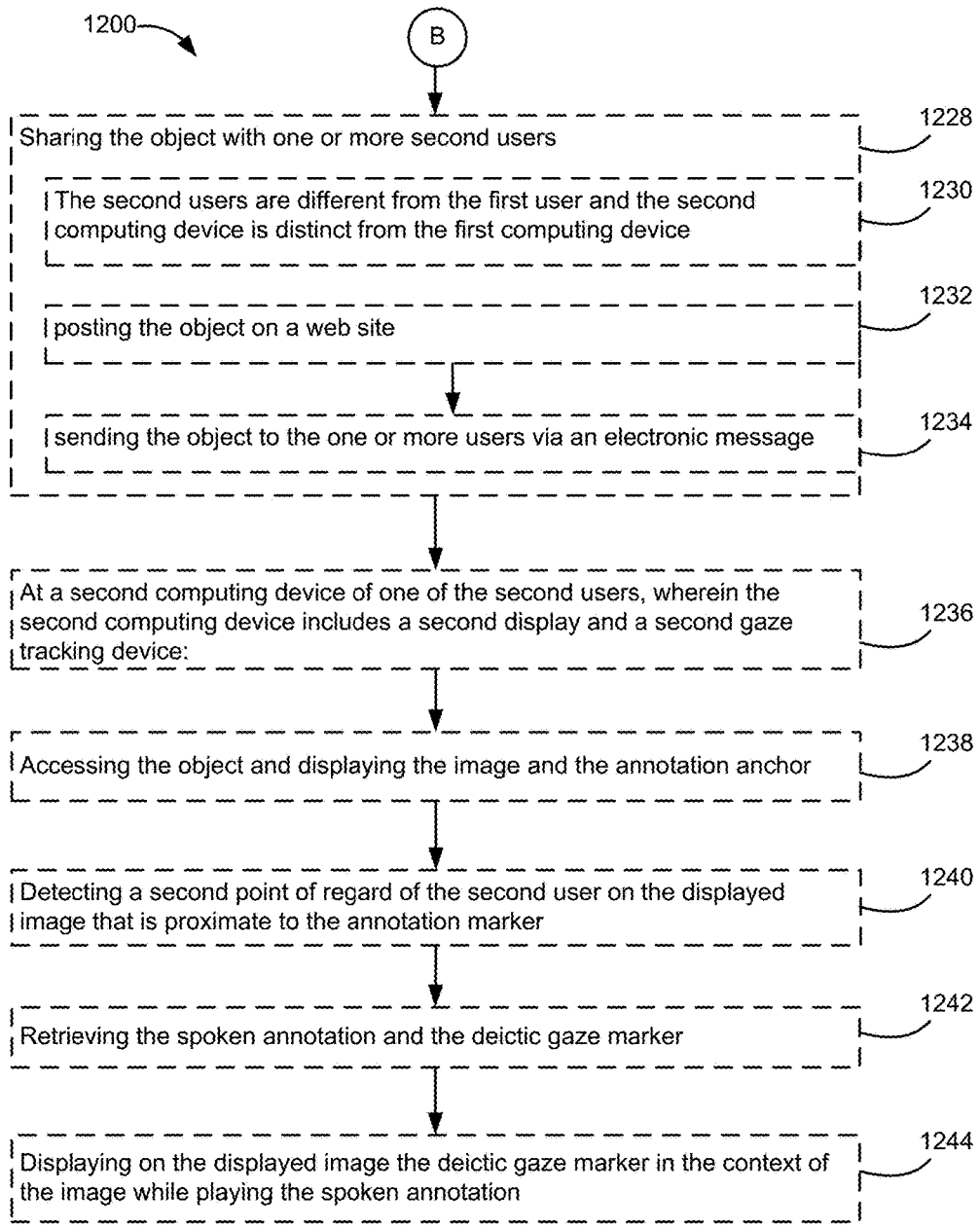

FIGS. 12A-12C illustrate a flow diagram of a gaze annotation method 1200 for a displayed image in accordance with some implementations. In some implementations, the method 1200 is performed at (1202) a computing device 106 in a gaze annotation system 100. The computing device 106 is coupled with a scene camera (e.g., the image capture device 308), a display (e.g., the display 346), and a gaze tracking device (e.g., the gaze tracking device 108). In some implementations, the computing device is (1204) head mounted and includes at least one of an accelerometer, gyroscope, or global positioning system to collect location and orientation information during annotation creation. In some implementations, the gaze tracking device includes (1206) an eye camera and a second computing device coupled to the eye camera, such that the eye camera captures a stream of eye images of a user's eye, and the second computing device receives this stream of eye images and performs gaze to compute points-of-regard.

In some implementations, the eye camera module 416 on the gaze tracking device 108 captures eye images using the image capture device 408, encodes the captured images into eye image data, and sends the streamed eye image data to the computing device 106 via the communication module 414 on the gaze tracking device 108 for gaze annotation. The gaze estimation module 418 on the gaze tracking device 108 then performs gaze estimation on the streamed eye image data received from the image capture device 408 and communicates the estimated gaze location to computing device 106 via the communication module 414.

The device 106 receives (1208) a first user command (e.g., a verbal command to Google Glass) to save and display an image from the scene camera 308 on the display 346. The device 106 further receives (1210) a second user command (e.g., tapping on Google Glass) to create an annotation for the displayed image. In response to the second user command, the device 106 receives (1212) from the gaze tracking device 108 a first point-of-regard in the displayed image. The device 106 displays an annotation anchor superimposed on the image proximate to first point-of-regard. For example, as shown in FIG. 7, in after two gaze annotations have been created, circled numbers ① and ② are displayed as annotation anchors proximate to the windsurfer to indicate the points-of-regard detected by the gaze tracking device 108. In another example, as shown in FIG. 11, annotation anchors proximate to a tip of a tail, leg of a deer, and neck of a deer are displayed to indicate the points-of-regard detected by the gaze tracking device 108.

In some implementations, the scene camera module 318 on the device 106 captures images (e.g., photos and/or videos) using the image capture device 308, encodes the captured images into image data, displays the image data on the display 346, and send the image data to the server system 120 via the network communication module 316 for display at the remote computing device. In some implementations, the communication module 316 also facilitates communication with other devices (e.g., the gaze tracking device 108). In some implementations, the communication module 316 communicates control signals to the gaze tracking device 108 in response to receiving the user commands (e.g., verbal commands and/or tapping). In some implementations, after receiving the gaze point-of-regard data, the annotation module 326 captures gaze annotations, generates annotation markers, associates the annotations with gaze regions, and sends the annotation information to the display 346 via the view display module 324. The view display module 324 receives the data, processes the data, and displays the data as markers, and/or visualizations of fields of view and/or the annotation on the display 346.

In addition to displaying the annotation anchor, the annotation module 326 on device 106 further analyzes the speech and gaze data for deictic gaze gestures by first receiving (1216) a spoken annotation from the user via the audio input device 324. In some implementations, the ASR module 328 on the device 106 transcribes (1218) the spoken annotation using automatic speech recognition. From the gaze data, a set of points-of-regard while the user utters the spoken annotation is identified and received (1219) by the device 106. From the transcribed spoke annotation, the device 106 identifies (1220) a keyword indicative of a deictic reference. The keyword is then aligned (1222) with the best matching point-of-regard within the set. After the alignment, the device 106 displays (1224) a deictic gaze marker on the display 346 as shown in FIG. 8.

In accordance with some implementations, the device 106 further saves (1226) the image, the spoken annotation, and the first point-of-regard as an annotation anchor, the aligned points-of-regard as deictic gaze markers as an object (e.g., a Json object) that is configured for subsequent access by one or more users. In some implementations, the object is saved as the gaze annotation data 332 on device 106 and/or as the gaze annotation data 530 on server 120. The device 106 can then shares (1228) the object with one or more second users. In accordance with some implementations, the second users are (1230) different from the first user and the second computing device is distinct from the first computing device, such as the systems as shown in FIG. 2 and FIG. 11.

In accordance with some implementations, the device 106 shares the object (e.g., Json object) by posting (1232) the object on a web site (e.g., a website with the server 120 as the backend system) and sending (1234) the object to the one or more users via an electronic message. In accordance with some implementations, the web site includes but not limited to a bulletin board, web site, photo service, and/or a social media platform, among others, so that a user is able to interact with the object and the gaze annotations therein using browser features, pointing device, speakers, and/or a gaze tracking device.

The above steps are described with respect to creating the gaze annotation. Once the gaze annotation is created, on the receiving end, a remote user (e.g., the user 112) can view the gaze annotation using (1236) a second computing device (e.g., the computing device 106-2 in FIG. 1) of one of the second users, in accordance with some implementations. In accordance with some implementations, the second computing device 106-2 can have a second display and a second gaze tracking device. The second computing device 106-2 first accesses (1238) the object and displays the image and the annotation anchor. The second computing device 106-2 can then detects (1240) a second point-of-regard of the second user on the displayed image that is proximate to the annotation anchor, retrieves (1242) the deictic gaze markers and the spoken annotation, and displays (1244) on the displayed image the deictic gaze marker in the context of the image while playing the spoken annotation. For example, as shown in FIG. 11, annotation markers proximate to a tip of a tail, leg of a deer, and neck of a deer are displayed in the context of the scene and possibly while playing the spoken annotation of the scene.

Figure 13A:
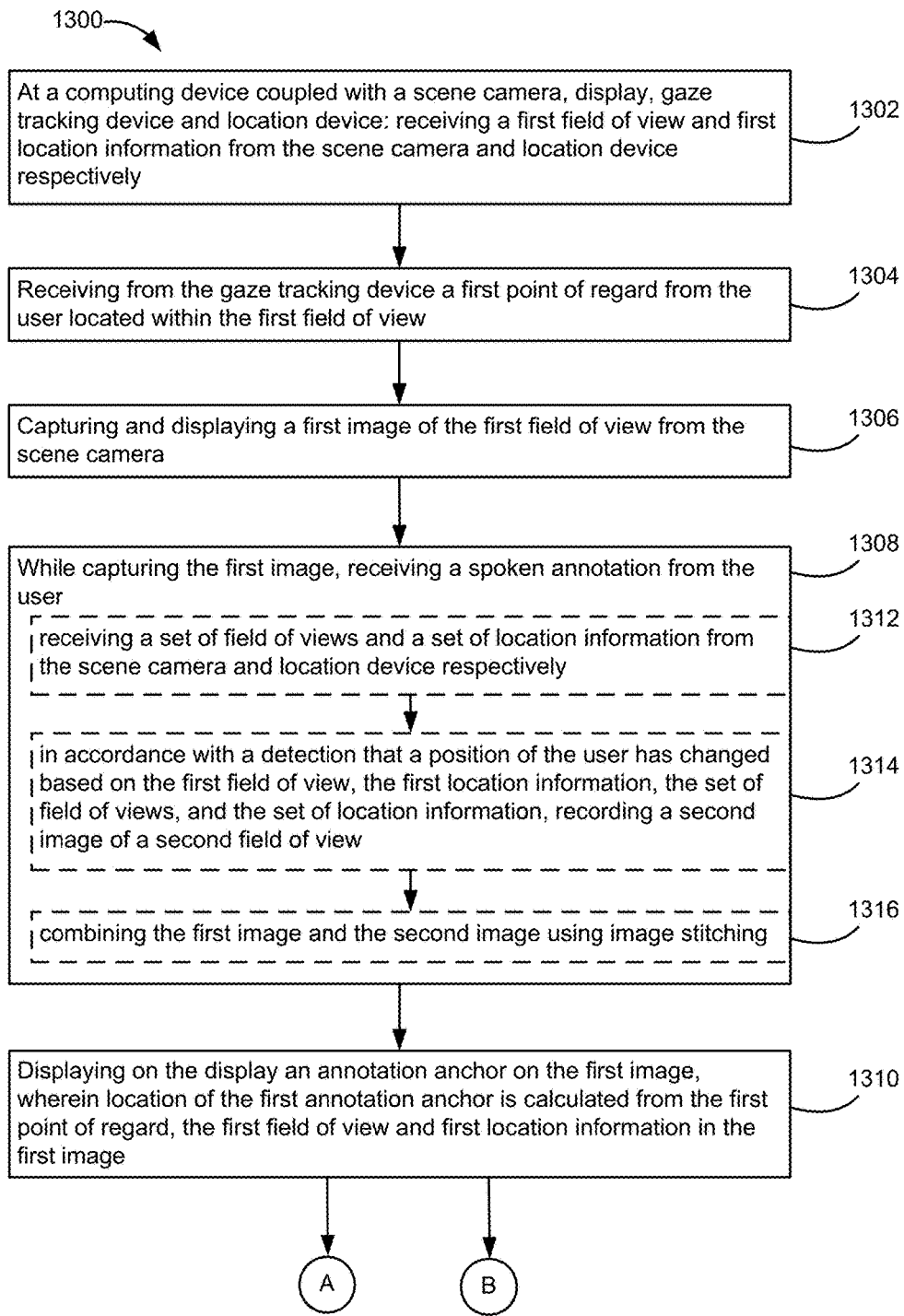
FIGS. 13A-13C illustrate a flow diagram of a gaze annotation method for a real-world scene in accordance with some implementations.
Figure 13B:
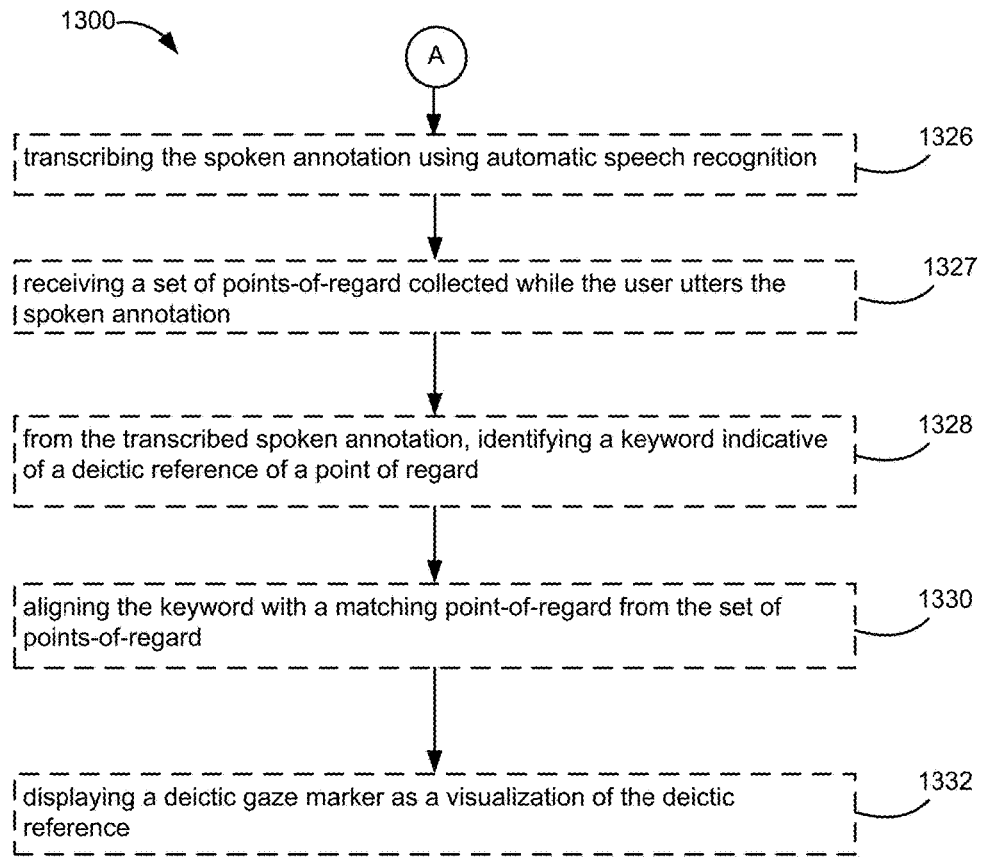
Figure 13C:
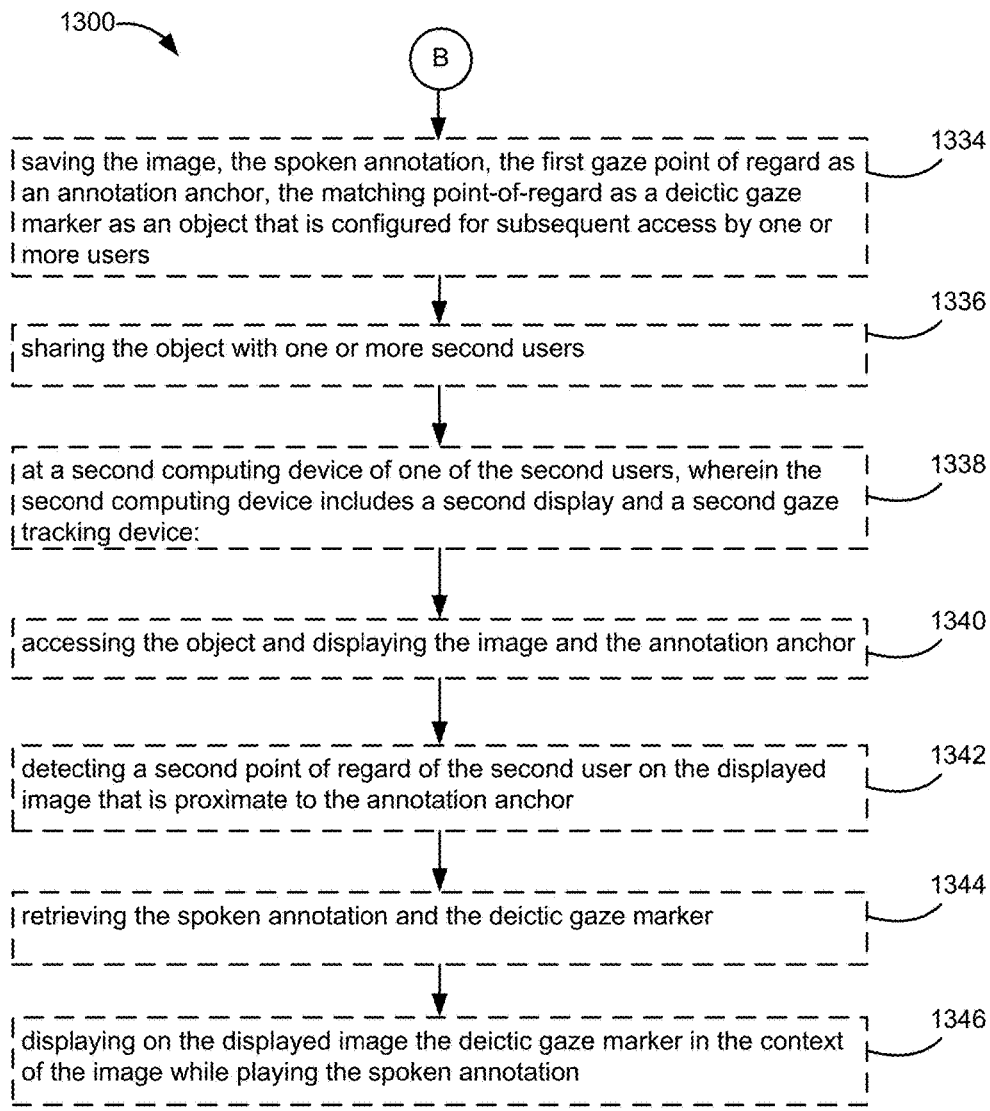

FIGS. 13A-13C illustrate a flow diagram of a gaze annotation method 1300 for a real-world scene in accordance with some implementations. In some implementations, the method 1300 is performed at (1302) a computing device 106 in a gaze annotation system 100. The computing device is coupled with a scene camera (e.g., the image capture device 308), a display (e.g., the display 346), a gaze tracking device (e.g., the gaze tracking device 108), and a location device (e.g., the sensor 312). The device 106 receives a first field of view and first location information from the scene camera (e.g., the image capture device 308) and location device respectively. The device 106 further receives (1304) from the gaze tracking device 108 a first point-of-regard from the user located within the first field of view. The first field view is captured (1306) as an image and displayed on the display (e.g., the display 346). While capturing the first image, the device 106 receives (1308) a spoken annotation from the user. The device 106 displays (1310) an annotation anchor on the first image to indicate the location of the point-of-regard. In some implementations, the location of the first annotation anchor is calculated from the first point-of-regard, the first field of view, and first location information in the first image.

As described above with respect to FIG. 10, different from the gaze annotation method for an image, in a real-world scene gaze annotation method, the location of the first annotation anchor within the captured is calculated based on not only the first point-of-regard, but also the first location information collected by the sensor module 320 from the sensor 312 on the device 106. Further, since the computing device 106 captures video clip or a series of photos while the user is looking around, the annotation anchor is placed in the context of combined images. During annotation, in accordance to some implementation, the device 106 further receives (1312) a set of field of views and a set of location information from the scene camera (e.g. the image capture device 308) and the location device (e.g., the sensor 312) respectively. The device 106 then determines whether the user has moved. A new field of view and location information is added to the sets if the user have moved from the last recorded position such that the new position is significant different. In some implementations, in accordance with a detection that a position of the user has changed based on the first field of view, the first location information, the set of field of views, and the set of location information, the scene camera (e.g., the image capture device 308) records (1314)

a second image of a second field of view and sends the image data to the device 106. In some implementation, the annotation module 326 on device 106 then seamlessly combines (1316) the second image with the first image using image stitching.

In some implementations, the annotation module 326 on device 106 further analyzes the speech and gaze data for deictic gaze gestures by first receiving a spoken annotation from the user via the audio input device 324. In some implementations, the ASR module 328 on the device 106 transcribes (1326) the spoken annotation using automatic speech recognition. From the gaze data, a set of points-of-regard while the user utters the spoken annotation is identified and received (1327) by the device 106. From the transcribed spoke annotation, the device 106 identifies (1328) a keyword indicative of a deictic reference of a point-of-regard. The keyword is then aligned (11330) with the best matching point-of-regard within the set of points-of-regard. After the alignment, the device 106 displays (1332) a deictic gaze marker on the display 346 as a visualization of the deictic reference.

In accordance with some implementations, the device 106 further saves (1334) the image, the spoken annotation, and the first point-of-regard as an annotation anchor, the matching points-of-regard as deictic gaze markers as an object (e.g., a Json object) that is configured for subsequent access by one or more users. In some implementations, the object is saved as the gaze annotation data 332 on device 106. The device 106 can then share (1336) the object with one or more second users.

On the receiving end, in some implementations, a remote user (e.g., the user 112) can view the gaze annotation at (1338) a second computing device (e.g., the computing device 106-2 in FIG. 1) of one of the second users. In accordance with some implementations, the second computing device 106-2 can have a second display and a second gaze tracking device. The second computing device 106-2 first accesses (1340) the object and displays the image and annotation anchor. The second computing device 106-2 can then detects (1342) a second point-of-regard of the second user on the displayed image that is proximate to the annotation anchor, retrieves (1344) the deictic gaze markers if any, and displays (1346) on the displayed image the deictic gaze markers in the context of the image while playing the spoken annotation. For example, as shown in FIG. 11, gaze markers proximate to a tip of a tail, leg of a deer, and neck of a deer are displayed in the context of the scene and possibly while playing the spoken annotation of the scene.

It will be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Reference has been made in detail to various implementations, examples of which are illustrated in the accompanying drawings. In the preceding detailed description, numerous specific details are set forth in order to provide a thorough understanding of the invention and the described implementations. However, the invention may be practiced without these specific details. In other instances, well-known methods, procedures, components, and circuits have not been described in detail so as not to unnecessarily obscure aspects of the implementations.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A gaze annotation method for an image, comprising:
    at a mobile device, wherein the mobile device is coupled with a scene camera, a display, an audio input device and a gaze tracking device that are disposed locally and in proximity to each other:
        displaying on the display a live image received from the scene camera of a scene in proximity to a first user;
        receiving a first user command from the first user to capture the live image from the scene camera;
        while displaying the captured live image, receiving a second user command from the first user to create an annotation for the displayed live image;
        in response to the second user command:
            identifying from information recorded by the gaze tracking device a first point-of-regard estimating the first user's gaze in the displayed live image;
            receiving a spoken annotation captured locally by the audio input device from the first user;
            transcribing the spoken annotation using automatic speech recognition;
            from the transcribed spoken annotation, identifying a keyword indicative of a deictic reference to the first point-of-regard;

associating the first point-of-regard with the deictic reference, including aligning the keyword with the first point-of-regard of the first user's gaze in the live image; and displaying on the live image a deictic gaze marker as a visualization of the deictic reference.

2. The method of claim 1, further comprising:

saving the live image, the spoken annotation, information of the first point-of-regard, and the deictic gaze marker as an object that is configured for subsequent access by one or more users; and sharing the object with one or more second users, including sending the object to a wearable computing device for display on a display of the wearable computing device.

3. The method of claim 2, wherein the mobile device includes a first computing device, further comprising:

at a second computing device used by a second user of the one or more second users, wherein the second computing device includes a second display and a second gaze tracking device:

accessing the object and displaying the live image;

detecting a second point-of-regard of the second user on the displayed live image that is proximate to the deictic gaze marker;

retrieving the spoken annotation and the deictic gaze marker; and displaying on the displayed live image the deictic gaze marker in the context of the live image while playing the spoken annotation.

4. The method of claim 3, wherein the one or more second users are different from the first user and the second computing device is distinct from the first computing device.

5. The method of claim 2, wherein sharing the object with one or more second users comprises one or more of:

posting the object on a web site; and sending the object to the one or more users via an electronic message.

6. The method of claim 1, further comprising:

displaying an annotation anchor on the live image proximate to the first point-of-regard of the first user's gaze; and associating the spoken annotation with the annotation anchor.

7. The method of claim 1, wherein the scene camera device is head mounted and includes at least one of an accelerometer, a gyroscope, and a global positioning system to collect image information including the location and orientation of the camera device.

8. The method of claim 1, wherein the gaze tracking device includes an eye camera and a gaze computing device coupled to the eye camera, such that:

the eye camera captures a stream of eye images of the first user's eye; and the gaze computing device receives the stream of eye images captured by the eye camera and performs therefrom gaze estimation to compute corresponding points-of-regard.

9. A gaze annotation method for a real-world scene, comprising:

at a mobile device used by a first user, the mobile device coupled with a scene camera, a display, a gaze tracking device, an audio input device and a location device that are disposed locally and in proximity to each other:

determining a first field of view for the scene camera, the first field of view being in proximity to the first user;

obtaining first location information from the location device;

identifying from information recorded by the gaze tracking device a first point-of-regard estimating the first user's gaze within the first field of view;

capturing and displaying a first live image of the first field of view from the scene camera;

while displaying the first live image received from the scene camera, receiving a spoken annotation captured locally by the audio input device from the first user;

transcribing the spoken annotation using automatic speech recognition;

from the transcribed spoken annotation, identifying a keyword indicative of a deictic reference to the first point-of-regard;

associating the first point-of-regard with the deictic reference, including aligning the keyword with the first point-of-regard of the first user's gaze in the live image; and displaying on the first live image a deictic gaze marker as a visualization of the deictic reference.

10. The method of claim 9, wherein receiving a spoken annotation from the first user includes:

receiving a set of field of views and a set of location information from the scene camera and location device respectively;

in accordance with a detection that a position of the first user has changed based on the first field of view, the first location information, the set of field of views, and the set of location information, recording a second live image of a second field of view; and combining the first live image and the second live image using image stitching.

11. The method of claim 9, further comprising:

displaying on the display an annotation anchor on the first live image, including determining a location of the first annotation anchor from the first point-of-regard, the first field of view and the first location information in the first live image.

12. The method of claim 9, further comprising:

saving the live image, the spoken annotation, information of the first gaze point-of-regard and the deictic gaze marker as an object that is configured for subsequent access by one or more users; and sharing the object with one or more second users, including sending the object to a wearable computing device for display on a display of the wearable computing device.

13. The method of claim 12, wherein the mobile device includes a first computing device, further comprising:

at a second computing device used by a second user of the one or more second users, wherein the second computing device includes a second display and a second gaze tracking device:

accessing the object and displaying the live image;

detecting a second point-of-regard of the second user on the displayed live image that is proximate to the deictic gaze marker;

retrieving the spoken annotation and the deictic gaze marker; and displaying on the displayed live image the deictic gaze marker in the context of the live image while playing the spoken annotation.

14. A mobile device, comprising:
a display;
a scene camera;
a gaze tracking device;
an audio input device;
memory;
one or more processors; and
one or more programs stored in the memory and configured for execution by the one or more processors, the one or more programs including instructions for:
  displaying on the display a live image received from the scene camera of a scene in proximity to a first user;
  receiving a first user command from the first user to capture the live image from the scene camera;
  while displaying the captured live image, receiving a second user command from the first user to create an annotation for the displayed live image;
  in response to the second user command:
    identifying from information recorded by the gaze tracking device a first point-of-regard estimating the first user's gaze in the displayed live image;
    receiving a spoken annotation captured locally by the audio input device from the first user;
    transcribing the spoken annotation using automatic speech recognition;
    from the transcribed spoken annotation, identifying a keyword indicative of a deictic reference to the first point-of-regard;
    associating the first point-of-regard with the deictic reference, including aligning the keyword with the first point-of-regard of the first user's gaze in the live image; and
    displaying on the live image a deictic gaze marker as a visualization of the deictic reference.

15. The mobile device of claim 14, the one or more programs further including instructions for:
  saving the live image, the spoken annotation, information of the first point-of-regard, and the deictic gaze marker as an object that is configured for subsequent access by one or more users; and
  sharing the object with one or more second users, including sending the object to a wearable computing device for display on a display of the wearable computing device.

16. The mobile device of claim 15, wherein the mobile device includes a first computing device, the one or more programs further including instructions for:
  at a second computing device used by a second user of the one or more second users, wherein the second computing device includes a second display and a second gaze tracking device:
  accessing the object and displaying the live image;
  detecting a second point-of-regard of the second user on the displayed live image that is proximate to the deictic gaze marker;
  retrieving the spoken annotation and the deictic gaze marker; and
  displaying on the displayed live image the deictic gaze marker in the context of the live image while playing the spoken annotation.

17. The mobile device of claim 16, wherein the one or more second users are different from the first user and the second computing device is distinct from the first computing device.

18. The mobile device of claim 14, the one or more programs further including instructions for:
  displaying an annotation anchor on the live image proximate to the first point-of-regard of the first user's gaze; and
  associating the spoken annotation with the annotation anchor.

19. The mobile device of claim 14, wherein the scene camera device is head mounted and includes at least one of an accelerometer, gyroscope, and global positioning system to collect image information including the location and orientation of the camera device.

20. The mobile device of claim 14, wherein the gaze tracking device includes an eye camera and a gaze computing device coupled to the eye camera, such that:
  the eye camera captures a stream of eye images of the first user's eye; and the gaze computing device receives the stream of eye images captured by the eye camera and performs therefrom gaze estimation to compute corresponding points-of-regard.

* * * * *